(12) United States Patent
Wang et al.

(10) Patent No.: US 9,936,472 B2
(45) Date of Patent: Apr. 3, 2018

(54) METHOD AND APPARATUS FOR COUNTING DEVICES RELATED TO BROADCAST DATA SERVICES

(75) Inventors: Jun Wang, San Diego, CA (US); Zhengwei Liu, San Diego, CA (US); Xiaoxia Zhang, San Diego, CA (US); George Cherian, San Diego, CA (US); Gordon Kent Walker, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 822 days.

(21) Appl. No.: 13/362,829

(22) Filed: Jan. 31, 2012

(65) Prior Publication Data

US 2012/0202493 A1  Aug. 9, 2012

Related U.S. Application Data

(60) Provisional application No. 61/440,800, filed on Feb. 8, 2011, provisional application No. 61/506,512, filed on Jul. 11, 2011.

(51) Int. Cl.
*H04W 4/00* (2009.01)
*H04W 60/00* (2009.01)
(Continued)

(52) U.S. Cl.
CPC .............. *H04W 60/00* (2013.01); *H04W 4/06* (2013.01); *H04W 68/00* (2013.01)

(58) Field of Classification Search
CPC ........ H04W 60/00; H04W 4/06; H04W 68/00
(Continued)

(56) References Cited

U.S. PATENT DOCUMENTS 8,059,625 B2 * 11/2011 Cai ............................... 370/341
8,804,592 B2 *  8/2014 Kim et al. .................... 370/312
(Continued)

FOREIGN PATENT DOCUMENTS

EP         2 413 617 A1    2/2012
JP       2010-502101 A    1/2010
(Continued)

OTHER PUBLICATIONS

"3rd Generation Partnership Project; Technical Specification Group Services and System Aspects; Multimedia Broadcast/Multicast Service (MBMS); Architecture and functional description (Release 9)", 3GPP Standard; 3GPP TS 23.246, 3rd Generation Partnership Project (3GPP),Mobile Competence Centre ; 650, Route Des Lucioles ; F-06921 Sophia-Antipolis Cedex; France, No. V9.5.0, Jun. 10, 2010 (Jun. 10, 2010), pp. 1-65, XP050441560, [retrieved on Jun. 10, 2010] sections 8.1-8.2; pp. 34-37.
(Continued)

*Primary Examiner* — Shahriar Behnamian
(74) *Attorney, Agent, or Firm* — Arent Fox, LLP

(57) ABSTRACT

Methods and apparatuses are provided that include counting devices for broadcast data services. The devices can be counted based on registrations received from the devices. This registration count can additionally or alternatively be used to determine whether further counting is desired. In addition, base stations can transmit counting requests to the devices using a paging message or other message such that idle mode devices can receive the counting requests. The idle mode devices can respond to the requests or send autonomous counting report by switching to an active mode for the purpose of responding or another purpose.

18 Claims, 22 Drawing Sheets

(51) Int. Cl.
*H04W 4/06* (2009.01)
*H04W 68/00* (2009.01)

(58) Field of Classification Search
USPC .................................................. 455/435.1
See application file for complete search history.

(56) References Cited

U.S. PATENT DOCUMENTS

| | | | |
|---|---|---|---|
| 2007/0161382 A1* | 7/2007 | Melinger | H04L 67/18 455/456.1 |
| 2008/0045224 A1 | 2/2008 | Lu et al. | |
| 2010/0157870 A1* | 6/2010 | Song et al. | 370/312 |
| 2010/0165905 A1 | 7/2010 | Kanazawa et al. | |
| 2010/0265867 A1* | 10/2010 | Becker | H04W 72/005 370/312 |
| 2010/0322128 A1 | 12/2010 | Becker et al. | |
| 2012/0026929 A1* | 2/2012 | Wang | H04W 72/005 370/312 |

FOREIGN PATENT DOCUMENTS

| | | |
|---|---|---|
| JP | 2013535916 A | 9/2013 |
| JP | 2013545322 A | 12/2013 |
| KR | 20100029023 A | 3/2010 |
| WO | WO-2008/023792 A1 | 2/2008 |
| WO | WO-2008/024214 A2 | 2/2008 |
| WO | WO-2010/109547 A1 | 9/2010 |
| WO | WO-2012015884 A1 | 2/2012 |

OTHER PUBLICATIONS

International Search Report and Written Opinion—PCT/US2012/023507, ISA/EPO—dated May 7, 2012.
CATR: "Two-Stages Method to Count RRC_IDLE UE," 3GPP TSG-RAN WG2 Meeting #71 R2-104754, Aug. 27, 2010.
LG Electronics: "LTE MBMS Counting Procedure," 3GPP TSG-RAN WG2 #59 R2-073359, Aug. 24, 2007.
Zte., "M2 MBMS Service Counting Request procedure", 3GPP Draft; R3-110144_M2 MBMS Service Counting Request Procedure, val. RAN WG3, No. Dublin, Ireland; Jan. 17, 2011, Jan. 10, 2011 (Jan. 10, 2011), XP050474140, [retrieved on Jan. 10, 2011].

* cited by examiner

METHOD AND APPARATUS FOR COUNTING DEVICES RELATED TO BROADCAST DATA SERVICES

CLAIM OF PRIORITY UNDER 35 U.S.C. § 119

The present application for patent claims priority to Provisional Application No. 61/440,800, entitled "SYSTEMS AND METHODS FOR PROVIDING SERVICES IN A WIRELESS NETWORK" filed Feb. 8, 2011, and Provisional Application No. 61/506,512, entitled "SYSTEMS AND METHODS FOR PROVIDING BROADCAST/MULTICAST SERVICES IN A WIRELESS NETWORK" filed Jul. 11, 2011, which are assigned to the assignee hereof and hereby expressly incorporated by reference herein.

BACKGROUND

Field

The following description relates generally to wireless network communications, and more particularly to broadcast/multicast services.

Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, ...). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP) (e.g., 3GPP LTE (Long Term Evolution)/LTE-Advanced), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

Base stations can also provide broadcast/multicast communications to one or more devices. In one example, the base stations can broadcast signals including data for multiple services within one or more subframes or other periods of time. In this example, the devices can obtain certain data from the signals; for example, the devices can subscribe to a service from the one or more base stations that broadcasts the signals, and in one example, can receive corresponding instructions for decoding the data from the signals. Examples of broadcast services can include Multimedia Broadcast and Multicast Service (MBMS), evolved MBMS (eMBMS), both of which are defined in LTE, and/or similar broadcast services for other network types.

Furthermore, eMBMS for example, provides a network-based counting procedure to obtain a number of devices receiving or decoding the broadcast signals from a base station by requesting the base station to broadcast a Counting Request. The Counting Request can identify certain devices, for example, and the devices receiving the Counting Request and determining that the request relates to the device can respond with a Counting Response over a unicast channel. Based on the responses received, the base station can determine a count of devices receiving broadcast services from the base station, and can report the count to the network. The count, however, may not be accurate as it only measures devices in a connected mode. In addition, such a polling procedure may require devices to wake up during certain time intervals and expend radio resources to respond to the Counting Request.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with improving counting procedures for broadcast data services. For example, various counting procedures are described that consider idle mode devices, utilize radio resources more efficiently, and/or the like. In one example, a registration-based counting can be provided where a network counts devices upon receiving a registration for a broadcast service. In another example, the network can determine whether to enable counting and/or whether to send a counting request for refined counting based on the number of devices currently registered to receive the service. Moreover, for example, idle mode devices can report counting as part of a random access procedure, in response to a counting request, and/or the like. This can include deferring reporting until the device switches to an active mode (e.g., for a purpose other than responding to the counting request). In other examples, the counting can be based on other device-based behavior, such as activating/deactivating broadcast service, autonomous reporting by the devices, etc.

According to an example, a method for counting devices related to broadcast data is provided. The method includes receiving a registration request for broadcast data related to a device and incrementing a registration count based in part on the receiving the registration request. The method further includes determining whether to enable counting of devices from one or more base stations based in part on the registration count.

In another aspect, an apparatus for counting devices related to broadcast data is provided. The apparatus means for receiving a registration request for broadcast data related to a device and means for incrementing a registration count based in part on the registration request. The apparatus further includes means for determining whether to request counting of devices from one or more base stations based in part on the registration count.

In yet another aspect, an apparatus for wireless communication is provided that includes at least one processor configured to receive a registration request for broadcast data related to a device, increment a registration count based in part on the registration request, and determine whether to request counting of devices from one or more base stations based in part on the registration count. The apparatus further includes a memory coupled to the at least one processor.

Still, in another aspect, a computer-program product for counting devices related to broadcast data is provided including a non-transitory computer-readable medium having code for causing at least one computer to receive a registration request for broadcast data related to a device. The computer-readable medium further includes code for causing the at least one computer to increment a registration count based in part on the registration request and code for causing the at least one computer to determine whether to request counting of devices from one or more base stations based in part on the registration count.

Moreover, in an aspect, an apparatus for counting devices related to broadcast data is provided that includes a registration information receiving component for receiving a registration request for broadcast data related to a device and a device counting component for incrementing a registration count based in part on the registration request. The apparatus further includes a counting request determining component for determining whether to request counting of devices from one or more base stations based in part on the registration count.

According to another example, a method for responding to a counting request for multicast broadcast data is provided. The method includes receiving a counting request from a base station while communicating in an idle mode with the base station and switching to an active mode for communicating with the base station. The method further includes responding to the counting request while in the active mode.

In another aspect, an apparatus for broadcast communication with a base station is provided. The apparatus includes means for receiving a counting request related to receiving broadcast data from a base station while communicating in an idle mode with the base station and means for switching to an active mode for communicating with the base station. The apparatus further includes means for responding to the counting request while in the active mode.

In yet another aspect, an apparatus for wireless communication is provided that includes at least one processor configured to receive a counting request related to receiving broadcast data from a base station while communicating in an idle mode with the base station, switch to an active mode for communicating with the base station, and respond to the counting request while in the active mode. The apparatus further includes a memory coupled to the at least one processor.

Still, in another aspect, a computer-program product for broadcast communication with a base station is provided including a non-transitory computer-readable medium having code for causing at least one computer to receive a counting request related to receiving broadcast data from a base station while communicating in an idle mode with the base station. The computer-readable medium further includes code for causing the at least one computer to switch to an active mode for communicating with the base station and code for causing the at least one computer to respond to the counting request while in the active mode.

Moreover, in an aspect, an apparatus for broadcast communication with a base station is provided that includes a counting request receiving component for receiving a counting request related to receiving broadcast data from a base station while communicating in an idle mode with the base station and a communication mode component for switching to an active mode for communicating with the base station.

The apparatus further includes a counting request responding component for responding to the counting request while in the active mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
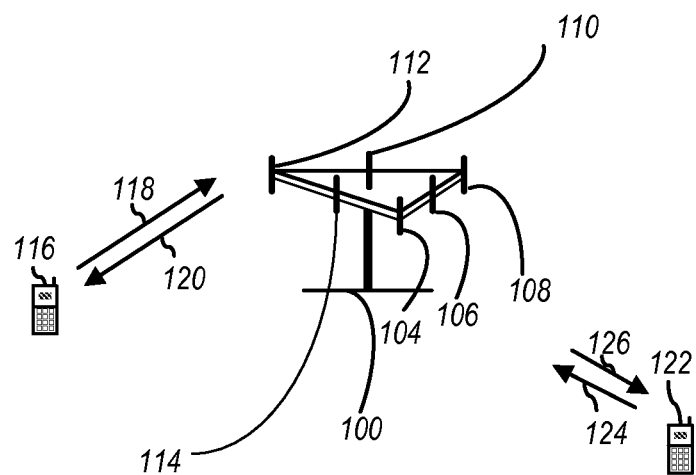
FIG. 1 is a multiple access wireless communication system according to an embodiment described herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Described further herein are various considerations related to improving counting of devices that receive and/or would like to receive data from one or more broadcast services. For example, counting can be based on device registration for the broadcast service. Thus, for example, upon receiving a registration request from a device, a network can increment a count of devices (e.g., and/or can decrement the count upon receiving a deregistration request). In addition, the network can determine whether to obtain a more accurate count by transmitting counting requests based in part on the number of registered devices reported by the base station. In another example, devices communicating in an idle mode can be counted by allowing the devices to switch to an active mode and transmit a counting response. In an example, the device can switch to the active mode for another purpose, but can respond to a previous counting request while in active mode. Moreover, in other examples, devices can autonomously report counting to the base station, report counting when activating/deactivating receiving the broadcast data, and/or the like.

As used in this application, the terms "component," "module," "system" and the like are intended to include a computer-related entity, such as but not limited to hardware, firmware, a combination of hardware and software, software, or software in execution, etc. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE), etc. A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, a tablet, a smart book, a netbook, or other processing devices connected to a wireless modem, etc. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE/LTE-Advanced and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, a multiple access wireless communication system according to one embodiment is illustrated. An access point 100 (AP) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 104 and 106, where antennas 104 and 106 transmit information to access terminal 122 over forward link 126 and receive information from access terminal 122 over reverse link 124. In a frequency division duplex (FDD) system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In some aspects, antenna groups each are designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point may be a fixed station used for communicating with the terminals and may also be referred to as an access point, a Node B, evolved Node B (eNB), or some other terminology. An access terminal may also be called an access terminal, UE, device, a wireless communication device, terminal, access terminal or some other terminology. Moreover, an access point can be a macrocell access point, femtocell access point, picocell access point, and/or the like.

In various embodiments, as described herein, one or more segments or one or more extension carriers can be linked to a regular carrier resulting in a composite bandwidth over which the UE can transmit information to, and/or receive information from, the eNB.

Figure 2:
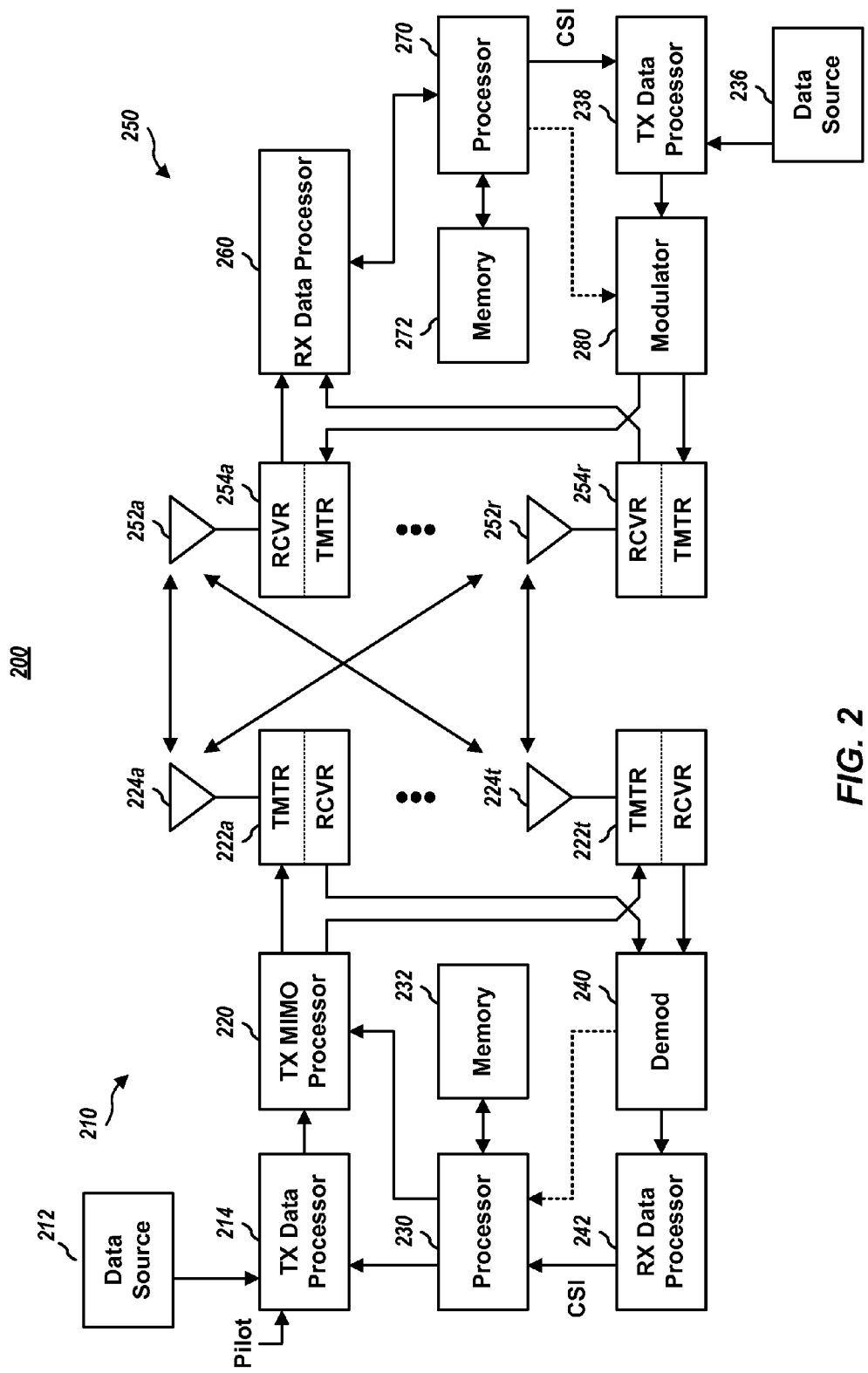
FIG. 2 is a block diagram of a communication system according to an embodiment described herein.

FIG. 2 shows an example wireless communication system 200. The wireless communication system 200 depicts one base station 210 and one mobile device 250 for sake of brevity. However, it is to be appreciated that system 200 can include more than one base station and/or more than one mobile device, wherein additional base stations and/or mobile devices can be substantially similar or different from example base station 210 and mobile device 250 described below. In addition, it is to be appreciated that base station 210 and/or mobile device 250 can employ the systems and methods described herein to facilitate wireless communication there between. For example, components or functions of the systems and/or methods described herein can be part of a memory 232 and/or 272 or processors 230 and/or 270 described below, and/or can be executed by processors 230 and/or 270 to perform the disclosed functions.

At base station 210, traffic data for a number of data streams is provided from a data source 212 to a transmit (TX) data processor 214. According to an example, each data stream can be transmitted over a respective antenna. TX data processor 214 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 250 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 230.

The modulation symbols for the data streams can be provided to a TX MIMO processor 220, which can further process the modulation symbols (e.g., for OFDM). TX MIMO processor 220 then provides $N_T$ modulation symbol streams to $N_T$ transmitters (TMTR) 222a through 222t. In various embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 222a through 222t are transmitted from $N_T$ antennas 224a through 224t, respectively.

At mobile device 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective signal, digitizes the conditioned signal to provide samples, and further processes the samples to provide a corresponding "received" symbol stream.

An RX data processor 260 can receive and process the $N_R$ received symbol streams from $N_R$ receivers 254 based on a particular receiver processing technique to provide $N_T$ "detected" symbol streams. RX data processor 260 can demodulate, deinterleave, and decode each detected symbol stream to recover the traffic data for the data stream. The processing by RX data processor 260 is complementary to that performed by TX MIMO processor 220 and TX data processor 214 at base station 210.

The reverse link message can include various types of information regarding the communication link and/or the received data stream. The reverse link message can be processed by a TX data processor 238, which also receives traffic data for a number of data streams from a data source 236, modulated by a modulator 280, conditioned by transmitters 254a through 254r, and transmitted back to base station 210.

At base station 210, the modulated signals from mobile device 250 are received by antennas 224, conditioned by receivers 222, demodulated by a demodulator 240, and processed by a RX data processor 242 to extract the reverse link message transmitted by mobile device 250. Further, processor 230 can process the extracted message to determine which precoding matrix to use for determining beamforming weights.

Processors 230 and 270 can direct (e.g., control, coordinate, manage, etc.) operation at base station 210 and mobile device 250, respectively. Respective processors 230 and 270 can be associated with memory 232 and 272 that store program codes and data. Moreover, processors 230 and 270 can assist in performing counting procedures, described further herein. For example, processors 230 and 270 can execute functions described with respect to such counting and/or memory 232 and 272 can store such functions and/or data related thereto.

In an aspect, logical channels are classified into Control Channels and Traffic Channels. Logical Control Channels may include a Broadcast Control Channel (BCCH), which is a DL channel for broadcasting system control information; Paging Control Channel (PCCH), which is a DL channel that transfers paging information; and Multicast Control Channel (MCCH), which may include a Point-to-multipoint DL channel used for transmitting Multimedia Broadcast and Multicast Service (MBMS) scheduling and control information for one or several Multicast Traffic Channel (MTCHs). Generally, after establishing a Radio Resource Control (RRC) connection, this channel is used by UEs that receive MBMS. Dedicated Control Channel (DCCH) is a Point-to-point bi-directional channel that transmits dedicated control information and used by UEs having an RRC connection. In one aspect, Logical Traffic Channels includes a Dedicated Traffic Channel (DTCH), which is a Point-to-point bi-directional channel, dedicated to one UE, for the transfer of user information. Also, an MTCH for Point-to-multipoint DL channel for transmitting traffic data may be used.

In an aspect, Transport Channels are classified into DL and UL. DL Transport Channels may include a Broadcast Channel (BCH), Downlink Shared Data Channel (DL-SDCH), and a Paging Channel (PCH). The PCH may be used for support of UE power saving functions (e.g., discontinuous reception, or DRX, cycle is indicated by the network to the UE), and may be broadcasted over an entire cell and mapped to PHY resources which can be used for other control/traffic channels. The UL Transport Channels may include a Random Access Channel (RACH), a Request Channel (REQCH), an Uplink Shared Data Channel (UL-SDCH) and plurality of PHY channels. The PHY channels may include a set of DL channels and UL channels.

The DL PHY channels may include a: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH).

The UL PHY Channels may include a: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

Figure 3:
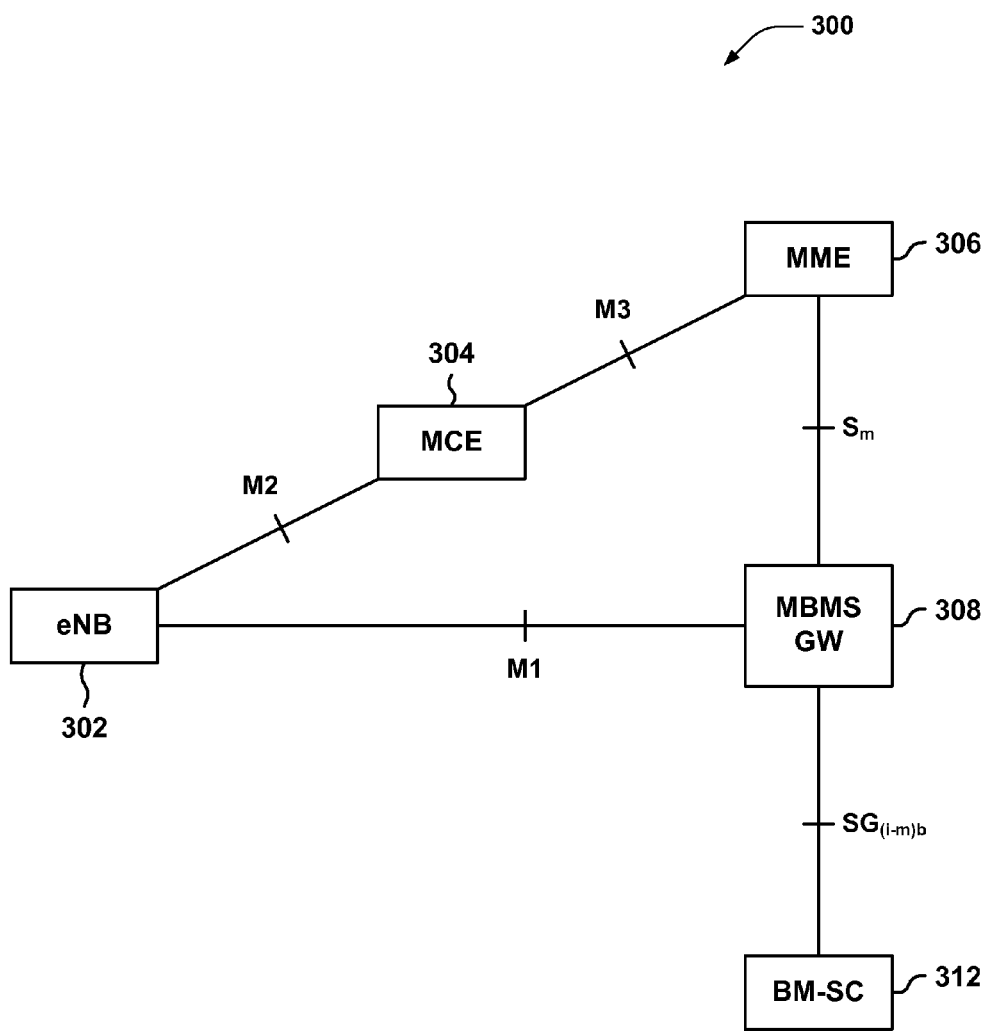
FIG. 3 is a block diagram of a wireless communication network for providing broadcast data communication.

FIG. 3 illustrates a block diagram of a network 300 for use in an LTE system. In some aspects, the network 300 includes an evolved UMTS Terrestrial Radio Access Network (E-UTRAN). The E-UTRAN may be used to provide wireless multimedia services, for example MBMSs, to one or more UEs. The MBMSs may include mobile television, provision of films or other audiovisual works, and the distribution of other content such as digital newspapers, for example. The E-UTRAN may be utilized to implement a Multicast Broadcast Single Frequency Network (MBSFN). In an MBSFN, identical waveforms may be transmitted at substantially the same time from multiple cells such that the waveforms are seen as a single transmission by UEs receiving the waveforms. In some aspects, the network 300 implements a mixed-carrier MBSFN.

The network 300 may include an eNB 302. As discussed above, the eNB 302 may include an access point, for example the AP 100. The eNB may wirelessly communicate with one or more UEs, for example as illustrated in FIG. 1. In this way, the MBMSs may be wirelessly transmitted to the UEs in communication with the network 300. Although a single eNB 302 is illustrated in FIG. 3, a plurality of eNBs may be implemented in the network 300.

The network 300 may further include a Multicell/Multicast Coordination Entity (MCE) 304 in communication with the eNB 302 via an interface M2. The MCE 304 manages MBMS content and resources. In some aspects, the MCE 304 determines a mode of delivering one or more MBMS. For example, the MCE 304 may optimize network resources such as by determining whether the eNB 302 provides an MBMS to a UE using point-to-point (p-t-p, also referred to herein as unicast) transmission or point-to-multipoint (p-t-m, also referred to herein as multicast) transmission, or when to transition between the two (e.g., which can be based on a count of devices requesting one or more services). Further, the MCE 304 may allocate time and frequency radio resources used by all eNBs in an MBSFN. Thus, a plurality of eNBs may be in communication with the MCE 304, for example over respective M2 interfaces. The M2 interface may include a control-plane interface, for example, that conveys session control signaling to the eNB 302. This signaling may include radio configuration data for multicell MBSFN transmission.

The network 300 may further include a Mobility Management Entity (MME) 306 in communication with the MCE 304 via an interface M3. The MME 306 can be responsible for paging, including retransmission, and tracking UEs which are in an idle mode. The MME 306 may be used in the bearer activation/deactivation process and may also be responsible for choosing a serving gateway for UE at time of the UE initially attaching and at the time of handover. The MME 306 may further be responsible for authenticating users. The M3 interface may include a control-plane interface, for example that carries session control signaling. This signaling may include session start and stop messages.

The network 300 may further include an MBMS Gateway (GW) 308 in communication with the eNB 302 via an interface M1. The MBMS GW 308 may broadcast packets to all eNBs within a service area. The MBMS GW 308 may further be responsible for MBMS session management. The M1 interface may include a user-plane interface. The M1 interface may use an IP multicast protocol for delivery of packets to the eNB.

The network 300 may further include a Broadcast/Multicast Service Center (BM-SC) 312 in communication with the MBMS GW 308. The BM-SC 312 can serve as an entry point for content providers or other broadcast/multicast sources external to the network 300. In some aspects, the BM-SC 312 determines which UEs are allowed to register for a service, and stores a record of which UEs are currently registered for any given service, for example in a database of services. The BM-SC 312 may also schedule broadcast and multicast sessions and provide MBMS session announcements. In some aspects, the interfaces between the elements 302-312 of the network 300 (e.g., the M1-M3 interfaces, $S_m$, and SG interfaces) may be referred to as the network backend or backhaul.

Figure 4:
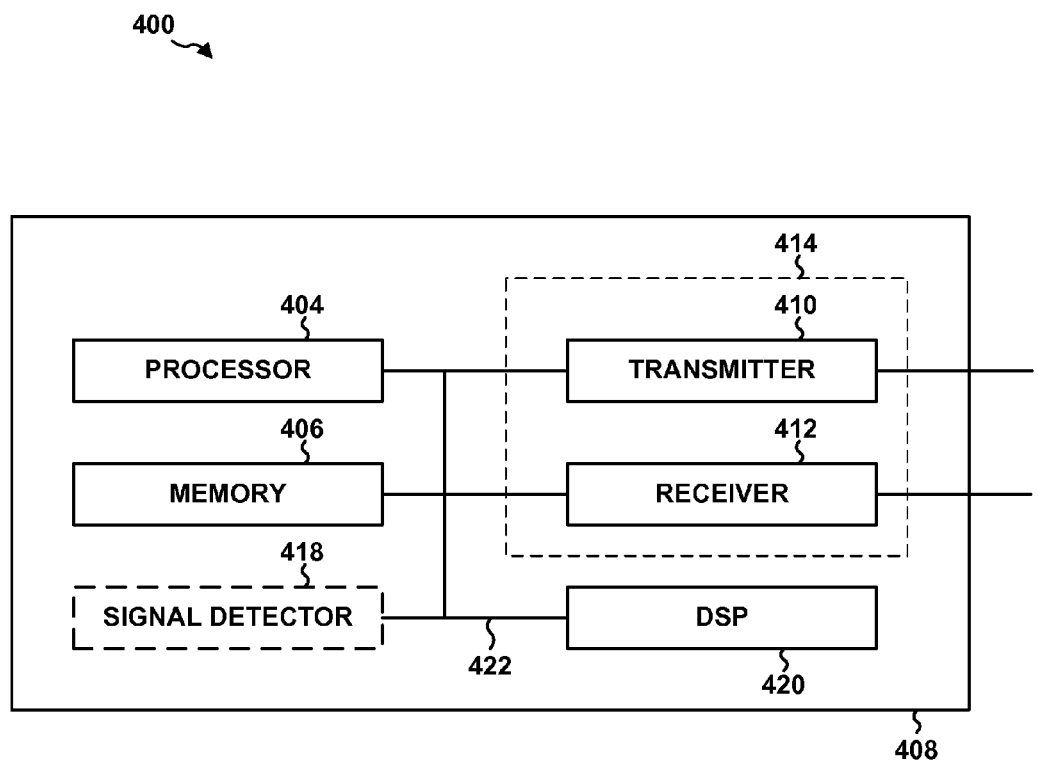
FIG. 4 is a block diagram of various components that may be utilized in a wireless communication system.

FIG. 4 illustrates various components that may be utilized in a device 400 that may be employed within the wireless communication system described with respect to FIG. 1 and/or the network 300 illustrated in FIG. 3. The device 400 is an example of a device that may be configured to implement the various methods described herein. The wireless device 400 may implement any of the devices illustrated in FIGS. 1-3.

The device 400 may include a processor 404 which controls operation of the device 400. The processor 404 may also be referred to as a central processing unit (CPU). Memory 406, which may include both read-only memory (ROM) and random access memory (RAM), provides instructions and data to the processor 404. A portion of the memory 406 may also include non-volatile random access memory (NVRAM). The processor 404 may perform logical and arithmetic operations based on program instructions stored within the memory 406. The instructions in the memory 406 may be executable to implement the methods described herein. In some aspects, the processor 404 implements one or more of the TX data processor 214 or 238, TX MIMO processor 220, processor 230 or 270, demodulator 240, RX data processor 242 or 260, and modulator 280.

The processor 404 may include or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The device 400 may also include a housing 408 that may include a transmitter 410 and a receiver 412 to allow transmission and reception of data or instructions, for example wirelessly and/or over one of the interfaces M1-M3 discussed above. The transmitter 410 and receiver 412 may be combined into a transceiver 414. In some aspects, a single or a plurality of transmit antennas may be attached to the housing 408 and electrically coupled to the transceiver 414. For example, when the device 400 is used to implement a UE or AT 116, or an AP 100 or eNB 302, the device 400 may include one or more antennas. The device 400 may also include (not shown) multiple transmitters, multiple receivers, and/or multiple transceivers. In some aspects, the transmitter 410 includes one or more of the transmitters 222 or 254 illustrated in FIG. 2. In some aspects, the receiver 412 includes one or more of the receivers 222 or 254.

In some aspects, the device 400 also includes a signal detector 418 that may be used in an effort to detect and quantify the level of signals received by the transceiver 414. The signal detector 418 may detect such signals and quantify the signals in terms of total energy, energy per subcarrier per symbol, power spectral density and other signals.

The device 400 may also include a digital signal processor (DSP) 420 for use in processing signals. In some aspects, the DSP 420 implements one or more of the TX data processor 214 or 238, TX MIMO processor 220, demodulator 240, RX data processor 242 or 260, and modulator 280.

The various components of the device 400 may be coupled together by a bus system 422, which may include a power bus, a control signal bus, and a status signal bus in addition to a data bus. The device 400 may further include other components or elements as will be understood by those having ordinary skill in the art.

Figure 5:
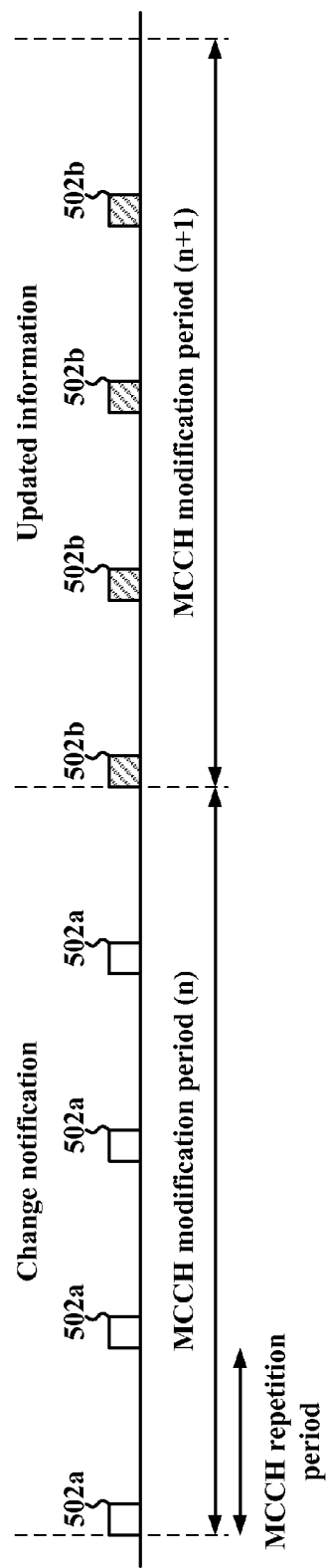
FIG. 5 is an example communication configuration from a base station communicating broadcast data.

FIG. 5 illustrates communications 502 between an eNB, such as the eNB 302 or the AP 100, and a UE, such as the AT 116 or 122. The communications 502 are illustrated as being transmitted over the MCCH. As discussed above, the MCCH may include a Point-to-multipoint DL channel used for transmitting MBMS scheduling and control information. Thus, the communications 502 may include information regarding wireless services for use by the UE. The communications may be used to indicate when a service is starting, for example, and the parameters of the service. In some aspects, the communications 502 include a Temporary Mobile Group Identity (TMGI), which may uniquely identify an MBMS Bearer Service. The TMGI may be allocated by the BM-SC 312 and sent to the MCE 304 for communication by the eNB 302 to UEs.

The communications 502 may be broadcast or multicast periodically from the eNB. The period between each broadcast is referred to as the MCCH repetition period. When a network, such as the network 300, changes at least some of the MCCH information, it may notify UEs about the change during a first modification period. In the next modification period, the network may transmit the updated MCCH information. For example, the communications 502a may notify any receiving UEs about a change in MCCH information, for example regarding the availability of certain MBMSs or the delivery thereof. The information transmitted in the following MCCH period, however, can include different information. Thus, upon receiving a change notification in the communications 502a, a UE interested to receive MBMS services may acquire the new MCCH information from the communications 502b, e.g., immediately from the start of the modification period n+1. The UE may apply the previously acquired MCCH information until the UE acquires new MCCH information.

In some aspects, indication of a radio network temporary identifier (RNTI), such as an MBMS RNTI (M-RNTI), on a Physical Downlink Control Channel (PDCCH) is used to inform UEs in an idle mode, such as RRC_IDLE for example, and UEs in a mode of being connected to the network, such as RRC_CONNECTED for example, about an MCCH information change. When receiving an MCCH information change notification, for example, in the communications 502a during MCCH modification period n, the UE knows that the MCCH information changes at the next modification period boundary, for example, the boundary with the MCCH modification period n+1.

Figure 6:
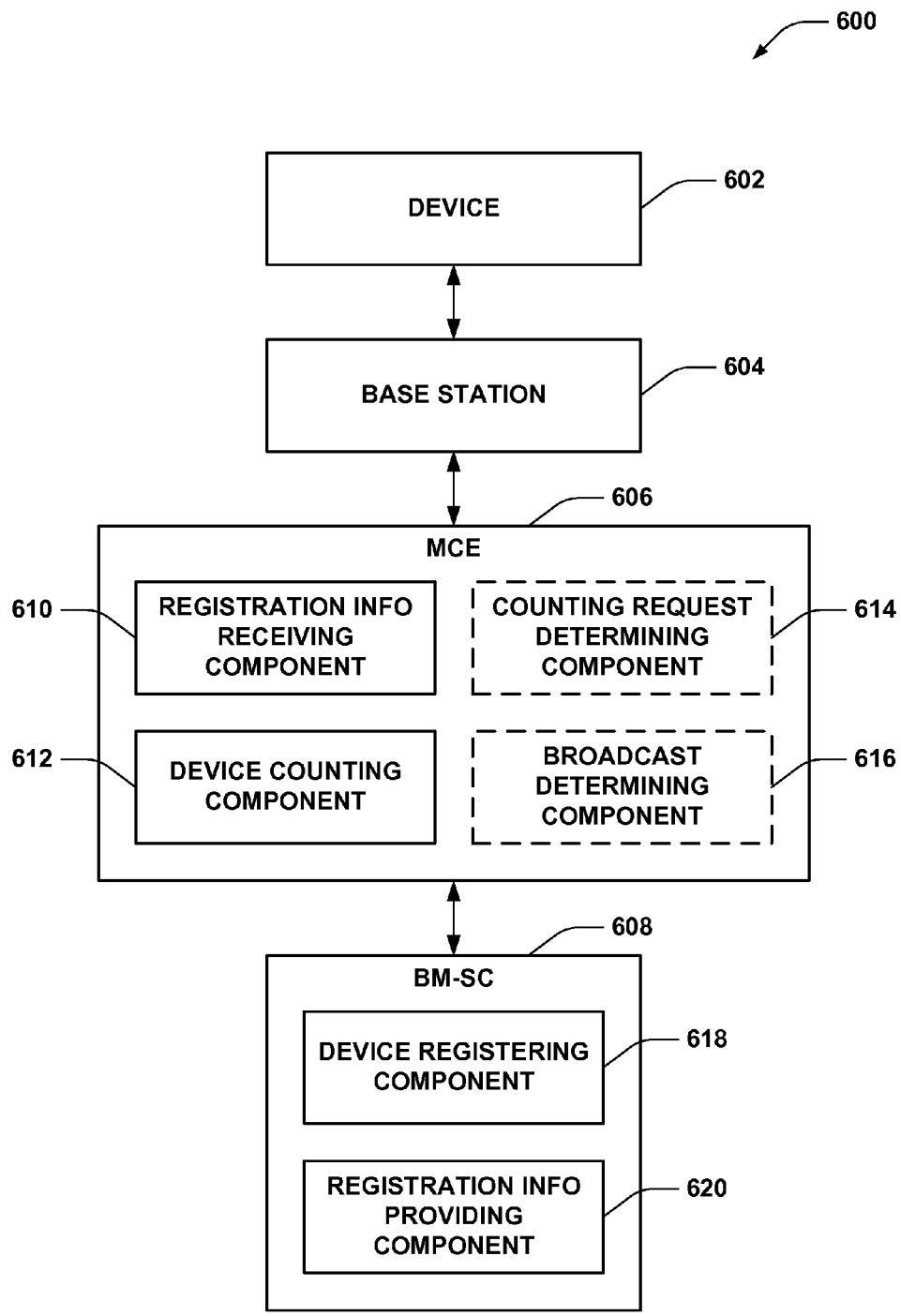
FIG. 6 is an aspect of an example system for counting device registrations.

FIG. 6 depicts an example wireless communication system 600 for counting devices to receive broadcast data in a wireless network. System 600 includes a device 602 that communicates with a base station 604, as described, to receive access to the wireless network. In addition, system 600 can include one or more core network components, such as a MCE 606, BM-SC 608, and/or other components not depicted (e.g., one or more gateways, MMEs, or other connection managing nodes), with which the base station 604 can communicate to provide the access. As described, base station 604 can broadcast signals related to one or more broadcast services, and the MCE 606, BM-SC 608, etc., can provide one or more functions related to providing the services.

MCE 606 can include a registration information receiving component 610 for obtaining information regarding a device registration for broadcast data services, and a device counting component 612 for determining a count of devices registered to receive broadcast data services. MCE 606 can also optionally include a counting request determining component 614 for requesting counting from one or more base stations of devices receiving broadcast data services therefrom, and/or a broadcast determining component 616 for determining whether to provide a broadcast data service.

BM-SC 608 can include a device registering component 618 for obtaining a registration request from a device for broadcast data services, and a registration information providing component 620 for communicating information regarding the registration request to one or more core network components.

According to an example, device 602 can register to receive broadcast data from base station 604. For example, this can include communicating a registration request to the base station 604 for the broadcast data (e.g., for an MBMS), which can forward the request to one or more core network nodes, such as a BM-SC 608 for processing. In another example, device 602 can send a registration message to BM-SC 608 directly over a user plane that traverses multiple network nodes, such as a base station 604, MCE 606, etc. This can be based on receiving a service announcement of broadcast data over one or more radio bearers. In one example, the device 602 can send the registration request over a unicast channel, and/or in a hypertext transfer protocol (HTTP) POST message, which can include a current time, location, etc., as described herein. Device registering component 618 can obtain the request of the device 602, and can determine whether to allow the device 602 to receive the broadcast data (e.g., based on an authentication procedure, based on available radio resources, etc.). In one example, BM-SC 608 can grant or deny the registration request to the device 602. In addition, registration information providing component 620 can communicate one or more parameters related to the registration request to MCE 606. For example, this can be performed upon receiving the registration request, according to a timer or other event with one or more registration requests from other devices, and/or the like.

Registration information receiving component 610 can obtain the one or more parameters related to the registration request. In one example, the one or more parameters can include an indication of a registration from a device, an identity of the device 602, the location of the device, an indication of the broadcast service for which registration is requested, the registration request itself, and/or the like. Thus, for example, registration information receiving component 610 can obtain the one or more parameters from the device 602 registration request, in one or more messages from the BM-SC during or following the registration request, and/or the like.

Upon receiving the registration information, device counting component 612 can increment a registration count of devices related to the broadcast service for which registration is requested within the area. For example, device counting component 612 can store the registration count (e.g., in memory), and can increment the stored registration count. It is to be appreciated that other network devices can store the registration count, and device counting component 612 can cause the other network devices to increment the registration count.

In any case, MCE 606 can utilize the registration count for various purposes, as described herein, such as a representative count of devices for a given broadcast data service, to determine whether to utilize unicast or multicast transmission, to determine whether to enable broadcast service counting requests (e.g., an eMBMS counting request procedure), and/or the like. In one example, based on the registration count, broadcast determining component 616 can determine whether to provide a multicast broadcast data service. For example, where the registration count is beyond a threshold, broadcast determining component 616 can instruct base station 604 and/or one or more other base stations to provide the multicast broadcast data service.

Moreover, for example, counting request determining component 614 can determine whether to obtain a counting using counting requests based on a number of devices registered. For example, counting request determining component 614 can compare a count of the number of registered devices to a threshold. For example, this can occur based on a timer or an event (e.g., such as device registration and/or deregistration). Where the number of registered devices is at least at the threshold, for example, counting request determining component 614 can determine to obtain counting using counting requests. In this example, counting request determining component 614 can communicate counting requests to one or more base stations, such as base station 604, and the base stations can accordingly broadcast counting requests, receive counting responses from one or more devices, and provide the number of counting responses received to MCE 606. For example, this can correlate to a Counting Request and Counting Response in eMBMS, as described.

There can be more than one threshold, in other examples, such that where the registration count is beyond a first threshold but below a second threshold, counting request determining component 614 can determine to obtain counting using counting requests, and counting request determining component 614 can accordingly communicate counting requests to one or more base stations. Based on the counting responses, broadcast determining component 616 can determine whether to provide a multicast broadcast data service. Where the registration count is beyond the second threshold, however, broadcast determining component 616 can determine that the number of registered devices is sufficient enough to provide a multicast broadcast data service without explicitly requesting counting via counting requests.

In another example, device registering component 618 can similarly receive a request for deregistration of the broadcast data services from the device 602, and registration information providing component 620 can similarly inform MCE 606. Registration information receiving component 610 can obtain the information regarding deregistration, and device counting component 612 can accordingly decrement the count of devices receiving the broadcast data service for which deregistration is requested. In addition, broadcast determining component 616 can determine whether to switch base station 604 to unicast transmission based in part on the count as decremented. In one example, counting request determining component 614 can determine whether to initiate counting requests to verify the number of counting responses is below the threshold before switching to unicast transmission based on the number of device registrations decremented below a threshold. It is to be appreciated that BM-SC 608 or another network component can similarly include a device counting component 612 to maintain a count of devices registered to receive broadcast data services, and/or a counting request determining component 614 for determining whether counting request counting is desired (e.g., and/or indicating such to the MCE 606).

Figure 7:
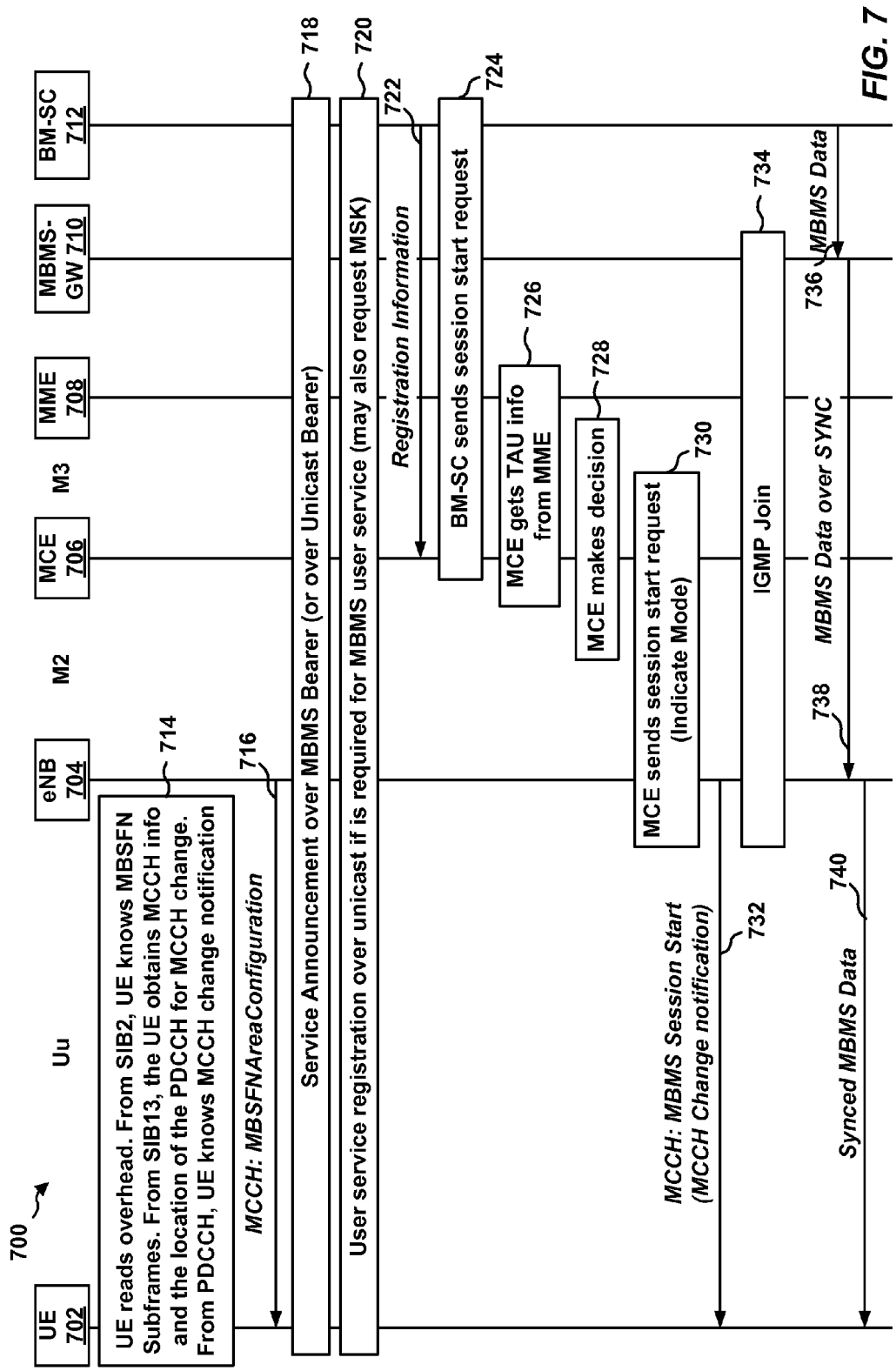
FIG. 7 is an aspect of an example system for counting devices registering to receive broadcast data.

FIG. 7 illustrates a system 700 for counting apparatuses receiving or interested in a wireless service. System 700 includes a UE 702 that communicates with an eNB 704 (e.g., over a Uu interface) for receiving access to a wireless network, as described. In addition, system 700 includes core network components, such as an MCE 706, MME 708, MBMS-GW 710, and/or BM-SC 712 for managing access to broadcast data services. For example, eNB 704 communicates with MCE 706 over an M2 interface, and MCE 706 communicates with MME 708 over an M3 interface in LTE. In the system 700, a quantity of apparatuses that are receiving or interested in a service is determined based on UE registration for the service. Data that is kept at the BM-SC 712 regarding which UEs are registered for a given service may be sent to the MCE 706 for determination of the mode of transmitting the service instead of, or as an indicator for, the MCE 706 requesting a count from the eNB 704.

For example, as shown, the UE 702 can read overhead messages to determine MBSFN subframes and MCCH information 714 for determining available eMBMSs. In addition, eNB 704 can provide a MBSFNAreaConfiguration 716 over the MCCH. The UE 702 receives a service announcement 718 over an MBMS bearer or over a unicast bearer, which can originate from BM-SC 712 and be broadcast by eNB 704. The UE 702 registers for the MBMS 720 with BM-SC 712, which can also include a request for a MBMS service key (MSK). The procedure of registering may be similar to the registration methods described herein. For example, the BM-SC 712 may be responsible for determining which MBMS services that UEs may register and may store a record of the registered UEs, for example in a database at the BM-SC 712. Registration may be required even for data flows that do not require security protection. The registration from UEs may be backed off for randomized time to avoid network congestions, and the registration message sent may include location information of the UE 702 that can be used by the network to estimate user density.

In this example, BM-SC 712 sends registration information 722 to the MCE 706. In some aspects, the registration information for each UE is sent to MCE 706 as it is received or determined at the BM-SC 712. In other aspects, the BM-SC 712 can wait for a period of time or collect information for a plurality of registration events before sending the registration information to the MCE 706. The BM-SC 712 can also include the registration information in an MBMS session start request message which is sent from the BM-SC 712 to MCE 706 via MBMS-GW 710 and MME 708. In yet another aspect, the MCE 706 requests the registration information from the BM-SC 712. The information sent to the MCE 706 may include not only information regarding which UEs have registered for a service, but also regarding any UEs that have deregistered from a service. Registration or deregistration can happen at any time.

The MCE 706 or BM-SC 712 may maintain a registration count of UEs that are registered for one or more of the services, as described. In response to the registration information, the registration count may be updated such that the count reflects the current number of UEs that are registered for a service within a service area or MBSFN area. In this way, registration (subscription) information may be used to derive an eMBMS counting result. In another example, based on the registration count, MCE 706 can determine whether to count UEs using over the air counting requests, as described. In another example, BM-SC 712 can make the determination and indicate a counting mode to MCE 706. The BM-SC 712 may send a session start request for the service 724. The MME 708 may send a tracking area update (TAU) 726 to the MCE 706. The TAU may include information regarding a location or location change of a UE 702.

In addition, the MCE 706 makes a decision as to a mode of transmitting the service 728, and sends a session start request 730 to the eNB 704 indicating the mode. The eNB 704 may communicate the start of the session 732 to the registered UE 702 over the MCCH, for example using a MCCH change notification as described above with respect to FIG. 5. When the service has ended, the session stop message may be sent over the MCCH. Further, a UE 702 may indicate that it does not wish to receive the service any more by deregistering, as described. Moreover, eNB 704 and MBMS-GW 710 can perform an Internet Group Management Protocol (IGMP) join 734, and BM-SC 712 can provide MBMS data 736 for broadcasting to UE 702. MBMS-GW 710 can receive the MBMS data 738 and can provide the MBMS data 738 to eNB 704 for broadcasting 740 to UE 702.

In this system 700, the network backend (e.g., MCE 706, MME 708, MBMS-GW 710, and/or BM-SC 712) is used to collect a registration count. The count may be event driven, for example in response to each UE registration or deregistration. In this example, not only can UEs in both an idle mode and a connected mode be counted, legacy UEs that register for a service but do not have the functionality to respond to Counting Requests can also be counted since the counting is registration-based. Moreover, such counting can conserve radio resources and/or UE power as compared to responding to periodic polling messages.

In some aspects, a UE 702 may provide the current time and/or location when registering for an MBMS. In one example, the current location may include the cell sector ID of the eNB 704 serving the UE 702. The network (e.g., the BM-SC 712 or other components) can use such information to determine whether the UE 702 is allowed to register for the MBMS, for example using the BM-SC 712 or based on information regarding the transmission of services from the MCE 706. In some aspects, the network controls the percentage of UEs that are allowed to register for a given broadcast data service. Therefore, when the UE 702 indicates that it intends to consume or terminate consumption of resources, by way of registering or deregistering, an eMBMS counting result may be determined based on the registration count and the network may decide whether registration is allowed.

Figure 8:
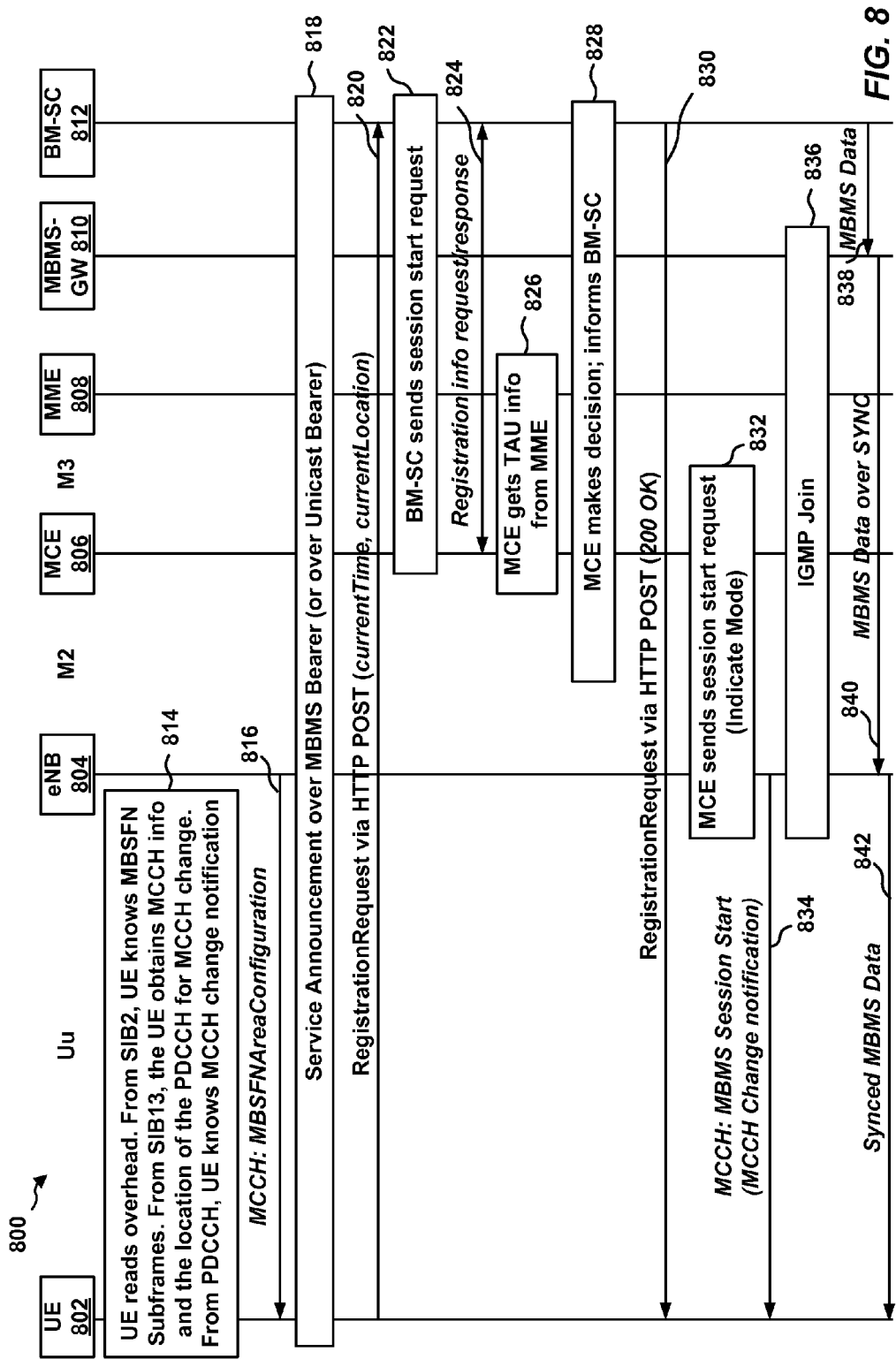
FIG. 8 is an aspect of an example system for counting devices registering to receive broadcast data over hyper text transfer protocol.

FIG. 8 illustrates a system 800 for counting apparatuses receiving or interested in a wireless service. System 800 includes a UE 802 that communicates with an eNB 804 for receiving access to a wireless network, as described. In addition, system 800 includes core network components, such as an MCE 806, MME 808, MBMS-GW 810, and/or BM-SC 812 for managing access to broadcast data services. The system 800 includes communications similar to those shown in FIG. 7, and may be used when the current time/location is included in the registration request.

For example, as shown, the UE 802 can read overhead messages to determine MBSFN subframes and MCCH information 814 for determining available eMBMSs. In addition, eNB 804 can provide a MBSFNAreaConfiguration 816 over the MCCH. The UE 802 receives a service announcement 818 over an MBMS bearer or over a unicast bearer. The UE 802 sends a registration request 820 for the service, which is processed at least partially by the BM-SC 812. In some aspects, the registration request may be sent using a HTTP POST procedure. The registration request may include the current time and location of the UE. The BM-SC 812 or another element in the network may determine whether to register the UE 802 for the service based at least in part on the time and location. The MCE 806 may also determine whether the UE 802 should be allowed to register, as discussed below.

The BM-SC may send a session start request 822 for the service. The BM-SC 812 sends registration information 824 to the MCE 806. As discussed above, the registration information may be used by the BM-SC 812 or MCE 806 to maintain a registration count of UEs that are registering for the service such that an eMBMS counting result may be determined. In some aspects, the BM-SC 812 sends the registration information to the MCE 806 at 824 for determining the registration count.

The MCE 806 may receive a TAU 826 from the MME 808. The MCE 806 may determine whether the UE 802 should be allowed to register for the service 828, for example based on the time and location information in the registration request and/or the TAU received from the MME 808. The MCE 806 alerts the BM-SC 812, which completes the registration or denial or registration, as described. The UE 802 is informed whether it has been registered 830. In some aspects, the BM-SC 812 informs the UE 802 using a Registration Response sent via a HTTP POST procedure.

The MCE 806 may determine a mode of transmitting the service, and sends a session start request 832 to the eNB 804 indicating the mode. The eNB 804 may communicate the start of the session 834 to the registered UE 802 over the MCCH, for example, using a MCCH change notification as described above with respect to FIG. 5. When the service has ended, the session stop message may be sent over the MCCH. Further, a UE 802 may indicate that it does not wish to receive the service any more by deregistering. Moreover, eNB 804 and MBMS-GW 810 can perform an IGMP join 836, and BM-SC 812 can provide MBMS data 838 for broadcasting to UE 802. MBMS-GW 810 can receive the MBMS data 840 and can provide the MBMS data 840 to eNB 804 for broadcasting 842 to UE 802.

The communications of system 800 include advantages similar to FIG. 7 discussed above. Further, information about a UE 802 location at the time of registration allows the MCE 806 to assess how many UEs in the MBSFN coverage area are currently accessing the service over the MBMS bearer, or are interested in accessing the service over the MBMS bearer. This information can be used by the MCE 806 independently of, or complementary to, count reporting from eNBs 804 to make MBSFN activation/deactivation decisions.

Figure 9:
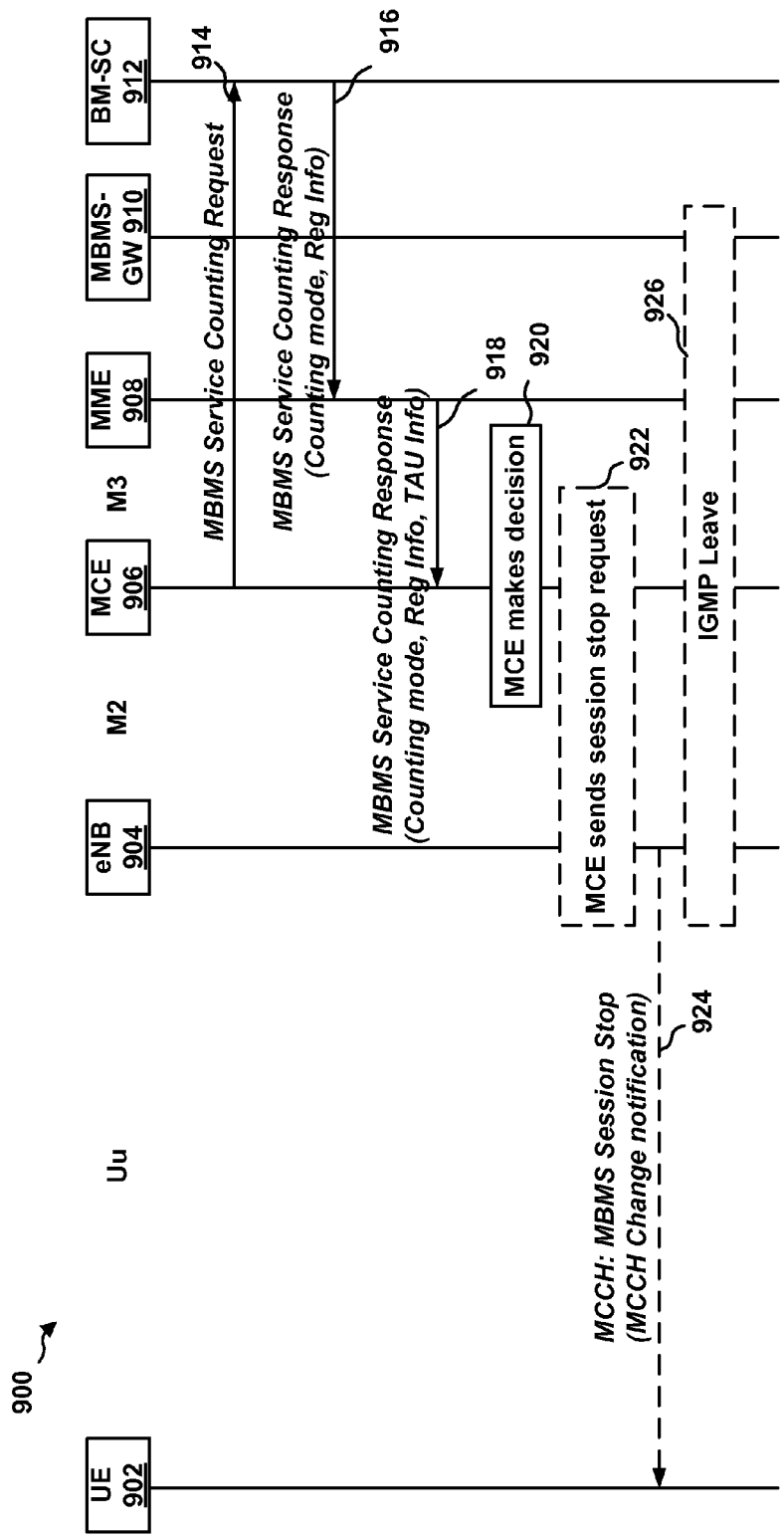
FIG. 9 is an aspect of an example system for requesting a counting of devices receiving or interested in receiving broadcast data.

FIG. 9 illustrates a system 900 of requesting counting of apparatuses receiving or interested in a wireless service. System 900 includes a UE 902 that communicates with an eNB 904 for receiving access to a wireless network, as described. In addition, system 900 includes core network components, such as an MCE 906, MME 908, MBMS-GW 910, and/or BM-SC 912 for managing access to broadcast data services. In the system 900, the MCE 906 can request counting information from the BM-SC 912, which can occur, for example, after registration information is received from the BM-SC 912 (e.g., as described in FIG. 8 at 824), or anytime after an eMBMS session has started.

For example, MCE 906 can transmit a MBMS service counting request 914 to the BM-SC 912 to request counting information related to apparatuses receiving or interested in a wireless service. In this example, the BM-SC 912 can respond with a MBMS service counting response 916, which can include a counting mode and registration information. The counting mode, for example, can specify whether to count a number of registered devices, whether to broadcast Counting Requests, and/or the like, as described. In addition, MME 908 can forward the MBMS service counting response at 918, which can include TAU information. For example, where the counting mode specifies that a count of registered devices can be used, MCE 906 can use a stored registration count, as described above, such that request/response counting can be avoided.

MCE 906 can make a decision 920 regarding whether to continue the MBMS session or deactivate the session (e.g., based on a number of devices registered to receive the MBMS service, or a number of devices counted based on the specified counting mode); for example, the session can have been started similarly as in FIG. 7 at 730, FIG. 8 at 832, etc. For example, the decision 920 can be based at least in part on the received counting response(s). This can include at least one of whether responses are received, a number of apparatuses indicated in the response(s), other registration information or TAU information in the responses, and/or the like, for example.

In the depicted example, the MCE 906 can optionally send a session stop request 922 based on the decision 920. For example, this can occur where responses to the counting request are not received and/or the responses indicate a number of apparatuses receiving or interested in the wireless service as below a threshold level. In this example, the eNB 904 can transmit a MBMS session stop 924 over MCCH to UEs that are in MBSFN area, such as UE 902. It is to be appreciated, however, the MCE 906 can determine 920 to continue the session based on received counting responses. Also, in this example, eNB 904 and MBMS-GW 910 can perform a IGMP leave 926 based on discontinuation of the MBMS. Moreover, as a result, eNB 904 can provide a related unicast service where one or more UEs are still registered to receive the service, as described.

Figure 10:
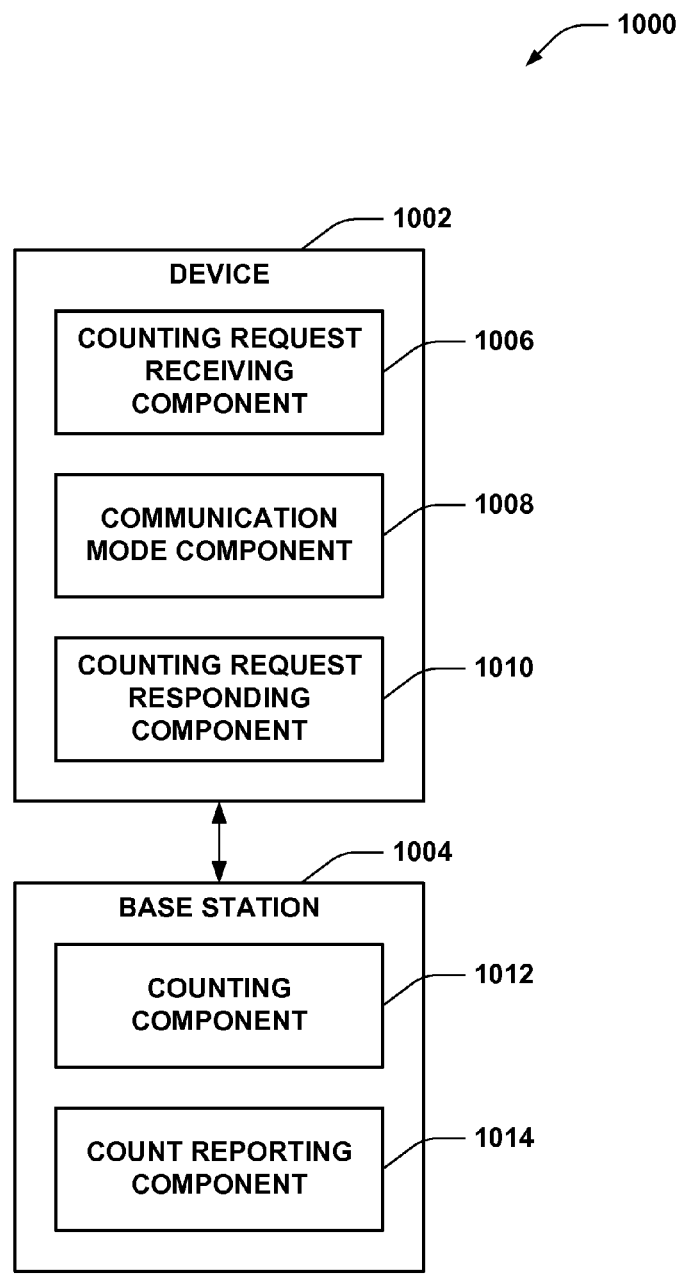
FIG. 10 is an aspect of an example system for responding to counting requests received in idle mode communications.

FIG. 10 shows an example wireless communication system 1000 for reporting counting of one or more devices receiving or at least interested in receiving broadcast data services. System 1000 includes a device 1002 that communicates with a base station 1004 to receive access to a core wireless network (not shown), as described. For example, system 1000 can allow the device 1002 to report counting based on a request from base station 1004 where the device 1002 is communicating in idle mode. Idle mode communications, for example, can relate to device 1002 powering off or reducing power to a transceiver except during certain time intervals during which base station 1004 can page device 1002 to switch to an active mode to receive data from the base station 1004. Thus, in idle mode, the device 1002 conserves radio resources, and can resume active mode communications upon receiving a page and/or based on an indication from an application or other process on the device 1002 that network access is requested.

Device 1002 can include a counting request receiving component 1006 for obtaining a counting request from a base station, a communication mode component 1008 for operating device 1002 in one or more communication modes, and a counting request responding component 1010 for responding to the counting request from the base station.

Base station 1004 can include a counting component 1012 for requesting and obtaining counting information from one or more devices, and a count reporting component 1014 for providing a count of devices receiving or interested in receiving a broadcast data service to one or more core wireless network components.

According to an example, communication mode component 1008 can operate device 1002 in an idle mode, as described above. Count reporting component 1014 can receive a request from the core wireless network to perform counting, as described herein, and counting component 1012 can accordingly communicate a counting request to device 1002. For example, the counting request can correspond to a Counting Request in an eMBMS configuration or other counting request broadcasted to the device 1002. In one example, counting component 1012 can transmit the counting request in a paging message so the device 1002 can receive the counting request when operating in idle mode.

Counting request receiving component 1006 can obtain the counting request in the paging message, for example, and can determine whether to respond to the counting request. For example, counting request receiving component 1006 can decode the paging message to obtain the counting request. In one example, the counting request can indicate one or more devices that should respond to the counting request by indicating TMGIs or other identifiers that can be assigned to devices upon registering to receive a certain broadcast data service, and counting request responding component 1010 can determine whether to respond to the counting request based in part on whether device 1002 receives the indicated TMGI or other identifiers during registering to receive the broadcast data service. In another example, the counting request sent by the base station 1004 can indicate the broadcast data service to which the counting request relates, and counting request responding component 1010 can determine whether to respond to the counting request based on whether device 1002 has requested or otherwise indicated to receive the related broadcast data service.

Where counting request responding component 1010 determines to respond to the counting request, this can occur immediately, within a period of time, based on communication mode component 1008 switching to active mode for another purpose, and/or the like. Moreover, the response can be part of an RRC Connection Request message or another messaging in an access procedure (e.g., a RACH procedure). For example, communication mode component 1008 can switch to active mode upon counting request responding component 1010 determining to respond to the counting request, and counting request responding component 1010 can accordingly respond to the counting request while in active mode communications with base station 1004. In another example, communication mode component 1008 can switch to active mode for another purpose, such as to respond to a paging signal from base station 1004, receive the broadcast data service from base station 1004, transmit data from an application on device 1002, and/or the like. Upon transitioning to active mode, counting request responding component 1010 can respond to the counting request.

In one example, counting request responding component 1010 can respond to the counting request within an associated response time. For example, the response time can be received from the base station 1004 (e.g., in the counting request, as a parameter during registration to receive the broadcast data service, etc.), received in a configuration from the network, received as a hardcoded parameter, and/or the like. In an example, counting request responding component 1010 can wait for at least a portion of the duration of the response time for communication mode component 1008 to switch to active mode, and can accordingly transmit the response in this case. If the communication mode component 1008 does not switch to active mode within at least the portion of the duration, counting request responding component 1010 can cause communication mode component 1008 to switch to active mode, and can then transmit the response.

In another example, counting request receiving component 1006 can obtain the request while communication mode component 1008 is operating device 1002 in active mode communications. In this example, counting request responding component 1010 can transmit a response to the counting request, where so determined, while communication mode component 1008 is operating device 1002 in the active mode. In another example, counting request receiving component 1006 can autonomously report counting to the base station when the device 1002 communicates with the base station 1004 in a connected mode for some other purposes, for example, receiving paging signals, originating a unicast data call, and/or the like. The autonomous reporting can also be based on updates of device's interested MBMS services or receiving MBMS services have been changed. In any case, counting component 1012 can receive the response or autonomous report from the device 1002 and/or other devices, and count reporting component 1014 can provide the count to the core wireless network, for example.

Figure 11:
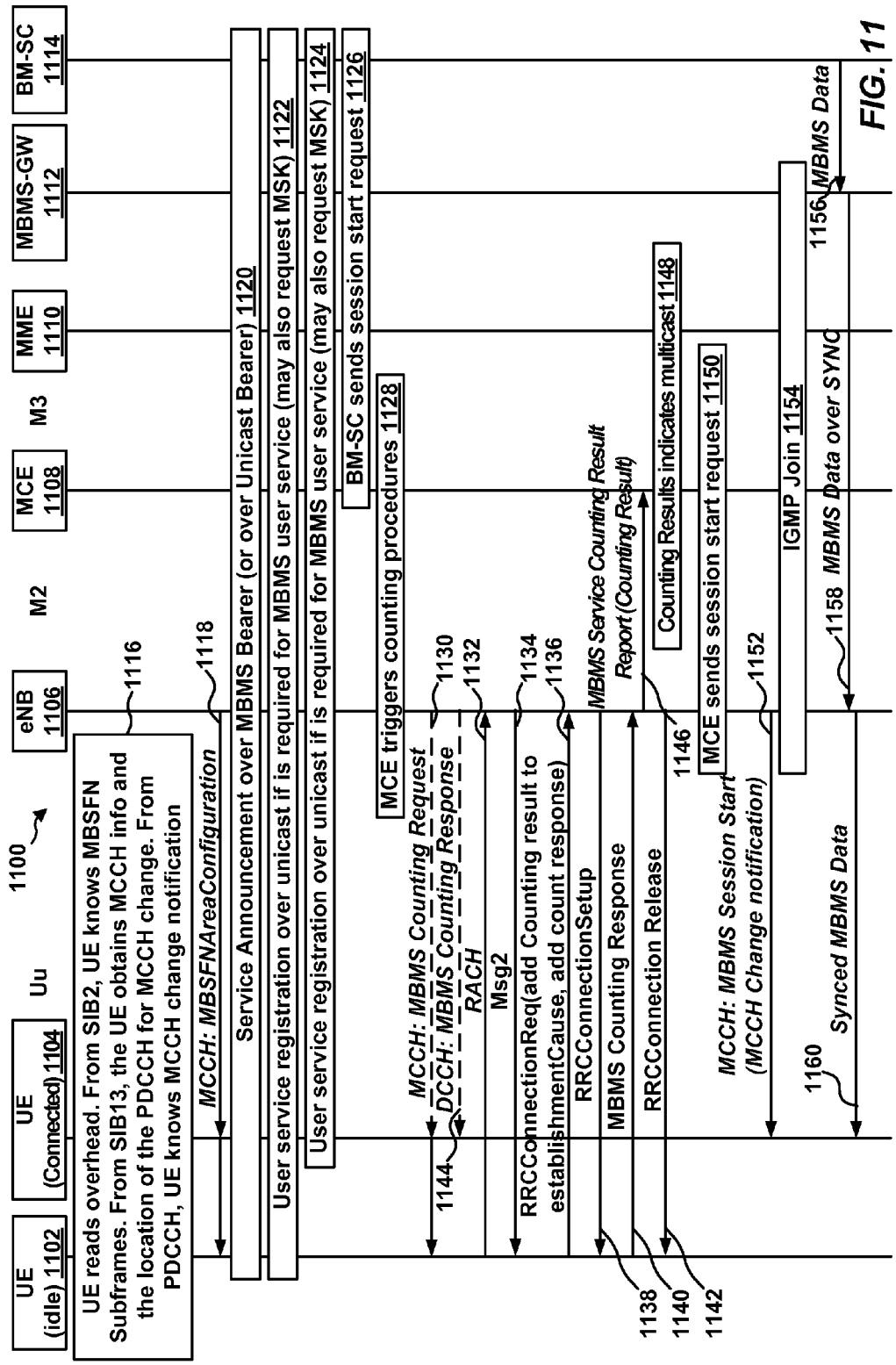
FIG. 11 is an aspect of an example system for counting devices receiving or interested in receiving broadcast data including idle mode devices.

FIG. 11 illustrates a system 1100 for counting apparatuses receiving or interested in a wireless service. System 1100 includes a UE in idle mode 1102 and/or a UE in connected mode 1104 that communicate with an eNB 1106 for receiving access to a wireless network, as described. In addition, system 1100 includes core network components, such as an MCE 1108, MME 1110, MBMS-GW 1112, and/or BM-SC 1114 for managing access to broadcast data services. In the system 1100, UEs that are in an idle state initiate a change to a connected state in part to respond to a Counting Request. The accuracy of the count may therefore be improved because idle UEs can also be included in the count, as described above and further herein.

For example, as shown, the UEs 1102 and/or 1104 can read overhead messages to determine MBSFN subframes and MCCH information 1116 for determining available eMBMSs. In addition, eNB 1106 can provide a MBSFNAreaConfiguration 1118 over the MCCH. The UEs 1102 and/or 1104 receive a service announcement 1120 over an MBMS bearer or over a unicast bearer, which can originate from BM-SC 1114 and be broadcast by eNB 1106. The UEs 1102 and/or 1104 register for the MBMS 1122 and 1124 with BM-SC 1114, which can also include a request for a MBMS service key (MSK). Moreover, BM-SC 1114 can send a session start request 1126 to MCE 1108 to indicate beginning of the MBMS session. Further, MCE 1108 can trigger counting procedures 1128 to eNB 1106, as described.

In one aspect of the system 1100, the UE 1102 receives a Counting Request 1130 for one or more services, for example as described above. In one example, UE 1102 can receive the Counting Request in a paging signal from eNB 1106. If the UE 1102 determines that it is receiving the service or interested in the service, and that it is in an idle, the UE 1102 can initiate a change to a connected state. For example, a UE 1102 in an RRC_IDLE mode may switch to a RRC_CONNECTED mode. To initiate the change, the UE 1102 may send a random access preamble 1132 over a random access channel to eNB 1106, such as the RACH. The preamble may be sent to contend for system resources, and may indicate that the UE 1102 desires to transmit a message.

If the preamble is received by the eNB 1106 and resources have been received for the message transmission, the eNB 1106 may transmit a message 2 or other RACH response 1134 to the UE 1102 indicating resources over which UE 1102 can request radio resources from eNB 1106. In some aspects, the response can be received over a downlink shared channel (DL-SCH).

The UE may respond with a connection request message 1136, for example an RRCConnectionReq transmitted over a common control channel (CCCH). The request message may be used to request a unicast connection to the eNB 1106 such that the UE 1102 may send a response to the Counting Request or for another purpose (e.g., in response to a paging message, in response to an application requesting network access, etc.). In an example, the connection request message can include the response to the counting message.

If the connection request is granted, a connection setup message 1138 may be sent indicating the parameters of the unicast connection. Using these parameters—and where the connection request message does not include the response—the UE 1102 may transmit a Counting Response message 1140 to the eNB 1106. In some aspects, as described, UEs that were previously idle respond a random period of time after obtaining the Counting Request 1130, respond when the UE switches to an active mode for another purposes, respond at least within a specified period of time, etc. Some UEs may determine whether to respond after a random amount of time based on coin-toss with a pre-advertised probability threshold.

If the UE 1102 is going to return to the idle state after transmitting the response, a connection release message 1142 may be transmitted to the UE 1102 to release the unicast connection. For example, this can occur where the UE 1102 switches to active mode for the purpose of sending the response to the Counting Request (e.g., where a period of time for sending the response is near expiration). In another example, UE 1104 can respond to the Counting Request 1130 with a Counting Response message 1144, for example over the DCCH. Moreover, in any case, eNB 1106 can send a MBMS Service Counting Result Report 1146 including the Counting Result from at least UE 1102 and/or 1104 to MCE 1108.

In one example, MCE 1108 can determine that the counting results indicate to switch to multicast communications 1148. In this example, the MCE 1108 can send a session start request 1150 to eNB 1106. The eNB 1106 may communicate the start of the session 1152 to the registered UE 1104 over the MCCH, for example using a MCCH change notification as described above with respect to FIG. 5. Moreover, eNB 1106 and MBMS-GW 1112 can perform an IGMP join 1154, and BM-SC 1114 can provide MBMS data 1156 for broadcasting to UE 1104. MBMS-GW 1112 can receive the MBMS data 1158 and can provide the MBMS data 1158 to eNB 1106 for broadcasting 1160 to UE 1104.

Using the system 1100, idle UEs may change to a connected state and respond to the Counting Request. In this way, the counting result may be more accurate. Switching to a connected state, however, may decrease battery life and may increase the traffic in the network.

In another aspect of the system 1100, idle UEs may respond to the Counting Request received at 1130 without fully establishing a unicast connection. This may reduce the overhead of initiating a change to a connected stated, while still allowing idle UEs to respond.

In this aspect of the system 1100, a UE 1102 may include a response to the Counting Request with the connection request message 1134. For example, the RRCConnection-Req includes an establishmentCause field in many releases of LTE. The establishmentCause field may be set to a certain value to indicate that the UE 1102 is responding to the Counting Request and to indicate the response. For example, the value can be an enumerated value defined to indicate that the UE 1102 is responding, such as countingResponse, which can be added to the establishmentCause enumerations in LTE including emergency, highPriorityAccess, mt-Access, mo-Signalling, mo-Data, delayTolerantAccess-v1020, etc. In another example, the indication can use one or more spare enumerations in the establishmentCause element.

When the eNB 1106 receives the connection request message and identifies that the value has been set to indicate a response to the Counting Request, the eNB 1106 may include the information indicated therein in the Counting Result Report message. The eNB 1106 may also determine that a unicast connection need not be established, and the transmissions 1138, 1140, and 1142 may be omitted. The eNB 1106 may therefore refrain from sending a further response to the UE 1102, in this example, and the UE 1102 may return to the idle state without receiving further communication from the eNB 1106 and without completing the connection procedure. In any case, the accuracy of eMBMS is increased without a substantial increase in resource utilization at the UE 1102 or the network.

Figure 12:
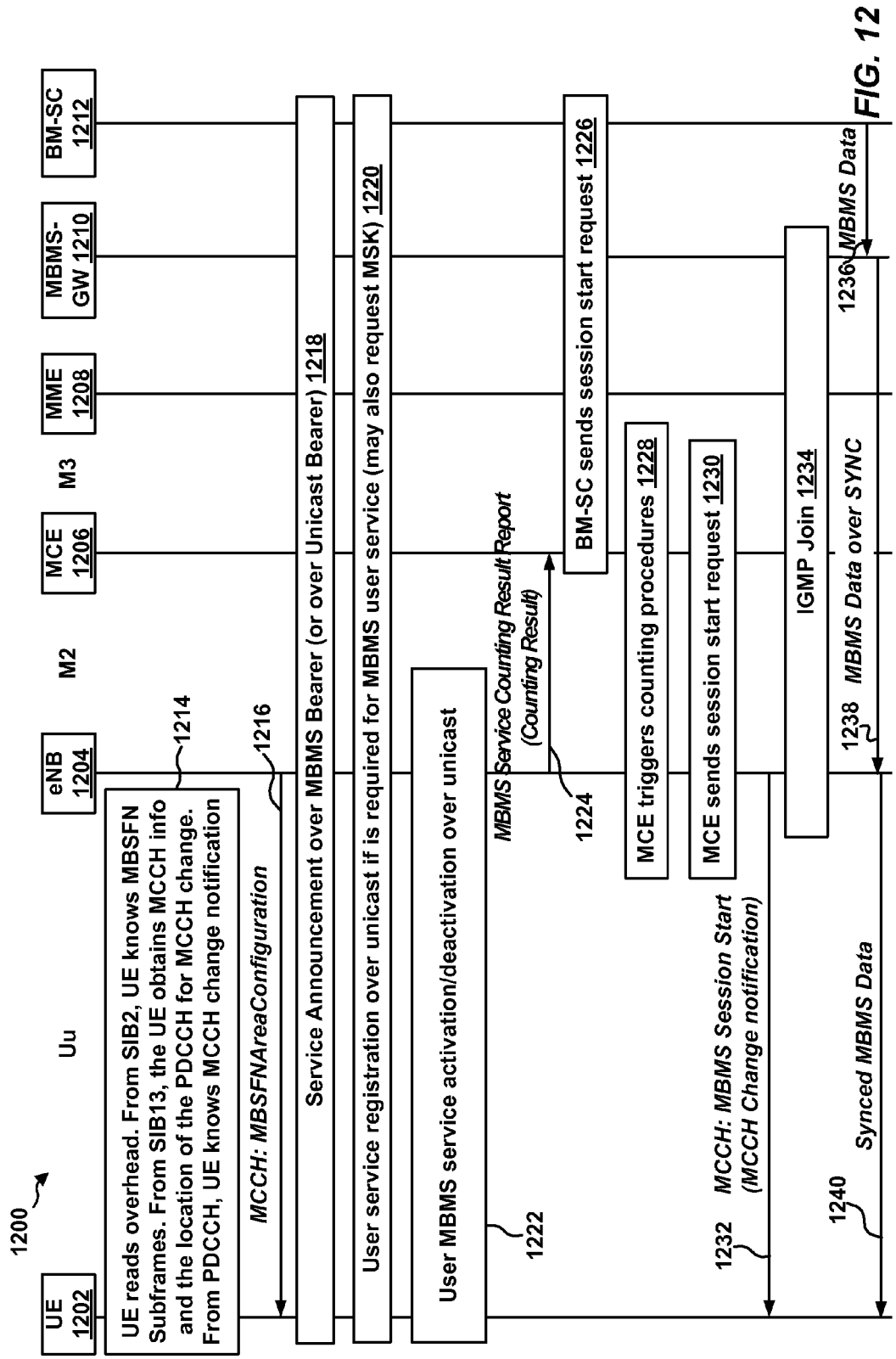
FIG. 12 is an aspect of an example system for counting devices receiving or interested in receiving broadcast data based on activation/deactivation of the broadcast service.

FIG. 12 illustrates a system 1200 for counting apparatuses receiving or interested in a wireless service. System 1200 includes a UE 1202 that communicates with an eNB 1204 for receiving access to a wireless network, as described. In addition, system 1200 includes core network components, such as an MCE 1206, MME 1208, MBMS-GW 1210, and/or BM-SC 1212 for managing access to broadcast data services. Moreover, UE 1202, in this example, can notify a network when it activates a service to receive broadcast data services.

For example, as shown, the UE 1202 can read overhead messages to determine MBSFN subframes and MCCH information 1214 for determining available eMBMSs. For example, such overhead messages can include system information block (SIB) messages, such as SIB2, SIB13 and/or similar messages. For example, from SIB2, UE 1202 can receive an indication of MBSFN subframes, and from SIB13, UE 1202 obtains MCCH info, the location of the PDCCH for MCCH change, etc. From PDCCH, UE 1202 can determine MCCH change notification. In addition, eNB 1204 can provide a MBSFNAreaConfiguration 1216 over the MCCH. The UE 1202 receives a service announcement 1218 over an MBMS bearer or over a unicast bearer. The UE 1202 sends a registration request 1220 for the service, which is processed at least partially by the BM-SC 1212.

After registering for a service, the UE 1202 locally activates the service to receive and process broadcast signals from eNB 1204. In addition, however, the UE 1202 transmits a message 1222, for example a MBMS service activation/deactivation message, to the eNB 1204 to notify the eNB that the service has been activated. In some aspects, both idle UEs and connected UEs transmit this message to the eNB 1204.

In some aspects, a connection to the eNB 1204 can be used in transmitting the message notifying the eNB 1204 of the activation. In such aspects, idle UEs may initiate a change from an idle mode to a connected mode as discussed above. An idle UE may fully establish a unicast connection, as discussed above, to notify the eNB 1204 of the service activation, or the idle UE may use the abbreviated procedure described above, including the notification in a field of the connection request where the remaining messages typically used to establish the connection are not sent.

The UE 1202 may also notify the eNB 1204 when it deactivates a service. Thus, the message 1222 may notify the eNB 1204 of a service deactivation instead of service activation.

When the eNB 1204 receives the notification of service activation or deactivation, the eNB 1204 may determine a Counting Result Report message and send the Report 1224 to the MCE 1206. In some aspects, the Report includes information regarding from where an activation or deactivation message is received. By monitoring activation/deactivation messages of the UE 1202, and from where the messages are sent, the network may determine the number of users in each cell related to a given MBMS, as described.

The BM-SC 1212 can send a session start request 1226 to the MCE 1206 based on the counting result, as described. MCE can trigger counting procedures 1228 to eNB 1204, and can send session start request 1230. The eNB 1204 may communicate the start of the session 1232 to the UE 1202 over the MCCH, for example, using a MCCH change notification as described above with respect to FIG. 5. Moreover, eNB 1204 and MBMS-GW 1210 can perform an IGMP join 1234, and BM-SC 1212 can provide MBMS data 1236 for broadcasting to UE 1202. MBMS-GW 1210 can receive the MBMS data 1238 and can provide the MBMS data 1238 to eNB 1204 for broadcasting 1240 to UE 1202.

In some aspects, the eNB 1204 reports service activation/deactivation upon receiving notification form a UE. In other aspects, the eNB waits for a period of time and accumulates notifications from UEs before sending the Counting Result Report message to the MCE. In still other aspects, the UE 1202 sends the Report in response to a Counting Request received from the MCE 1206. The MCE 1206 may use the Counting Result Report message to determine a mode of service transmission, as described above.

Figure 13:
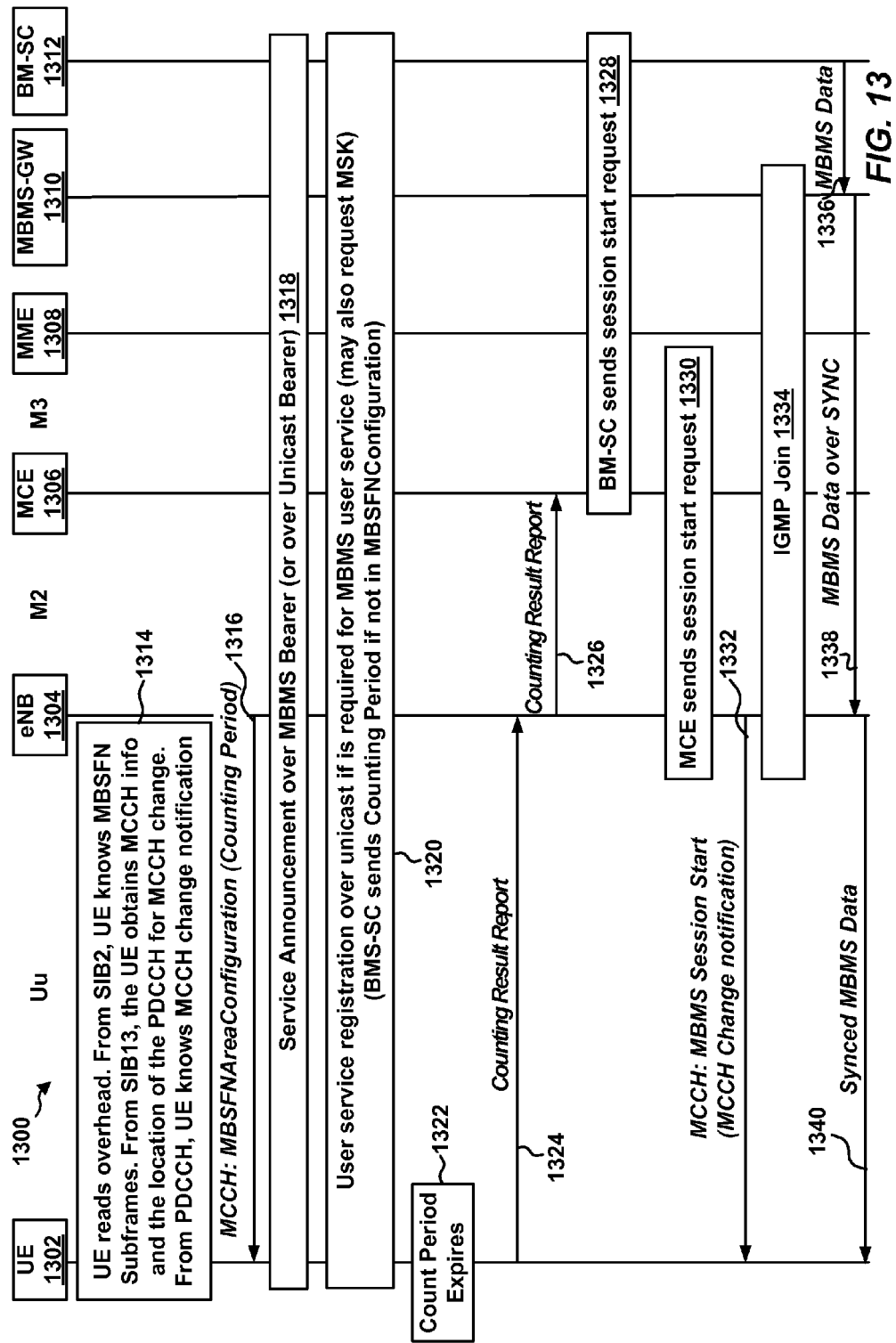
FIG. 13 is an aspect of an example system for counting devices receiving or interested in receiving broadcast data by responding to counting requests after a period of time.

FIG. 13 illustrates a system 1300 for counting apparatuses receiving or interested in a wireless service. System 1300 includes a UE 1302 that communicates with an eNB 1304 for receiving access to a wireless network, as described. In addition, system 1300 includes core network components, such as an MCE 1306, MME 1308, MBMS-GW 1310, and/or BM-SC 1312 for managing access to broadcast data services. In the system 1300, the UE 1302 periodically transmits a Counting Response message to the eNB 1304. This periodic transmission may be performed even in the absence of a Counting Request from the eNB 1304, for example.

For example, as shown, the UE 1302 can read overhead messages to determine MBSFN subframes and MCCH information 1314 for determining available eMBMSs. In addition, eNB 1304 can provide a MBSFNAreaConfiguration 1316 over the MCCH. The UE 1302 receives a service announcement 1318 over an MBMS bearer or over a unicast bearer. The UE 1302 sends a registration request 1320 for the service, which is processed at least partially by the BM-SC 1312.

When registering for a service 1320, the UE 1302 may set a report period timer. When the report period timer expires 1332, the UE 1302 generates and transmits a Counting Response message 1324. The report period timer may then be reset, and another Counting Response message sent upon the next expiration of the timer. In this way, a Counting Response message may be transmitted by the UE 1302 at a period that is substantially equal to the report period.

In some aspects, the UE 1302 determines the report period based on a received overhead message. For example, the report period may be included in an MBSFN configuration message as a timer value, a time interval, one or more explicit times, and/or the like. In some aspects, the UE 1302 determines the report period based on information received during registration for the service 1320. For example, the BM-SC 1312 may determine the report period during registration and notify the UE 1302.

In some aspects, the UE 1302 determines which services to include in the Counting Response message based on an overhead message, and/or on information received during registration. In other aspects, the UE 1302 is able to determine which services to report based on a type of the services, or the UE 1302 is programmed to report certain of the services.

The Counting Response message may be periodically generated and sent by UEs in a connected state, as well as UEs in an idle state. If a UE is in an idle state, the UE may initiate a change to the connected state as described above with respect to the system 1300. When a UE is in the connected mode, the UE may piggy back the Counting Response message on a data upload, and thereafter reset the timer. In this way, a separate transmission would not be needed for the Counting Response message.

After receiving the Counting Result 1324, the eNB 1304 may send a Counting Result Report message 1326 to the MCE 1306. The Report may be sent upon reception of the Counting Response message, or the MCE 1306 may wait for a period of time or may wait for a request from the MCE 1306, for example similar to the way in which the MCE 1306 operates to report the service activation/deactivation in FIG. 12. The MCE 1306 may use the Counting Result Report message to determine a mode of transmission for the reported services.

The BM-SC 1312 can send a session start request 1328 to the MCE 1306 based on the counting result, as described. MCE can send session start request 1330 to eNB 1304. The eNB 1304 may communicate the start of the session to the UE 1302 over the MCCH 1332, for example, using a MCCH change notification as described above with respect to FIG. 5. Moreover, eNB 1304 and MBMS-GW 1310 can perform an IGMP join 1334, and BM-SC 1312 can provide MBMS data 1336 for broadcasting to UE 1302. MBMS-GW 1310 can receive the MBMS data 1338 and can provide the MBMS data 1338 to eNB 1304 for broadcasting 1340 to UE 1202.

FIGS. 14-17 illustrate example methodologies relating to counting devices requesting, interested in receiving, or otherwise related to broadcast data. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 14:
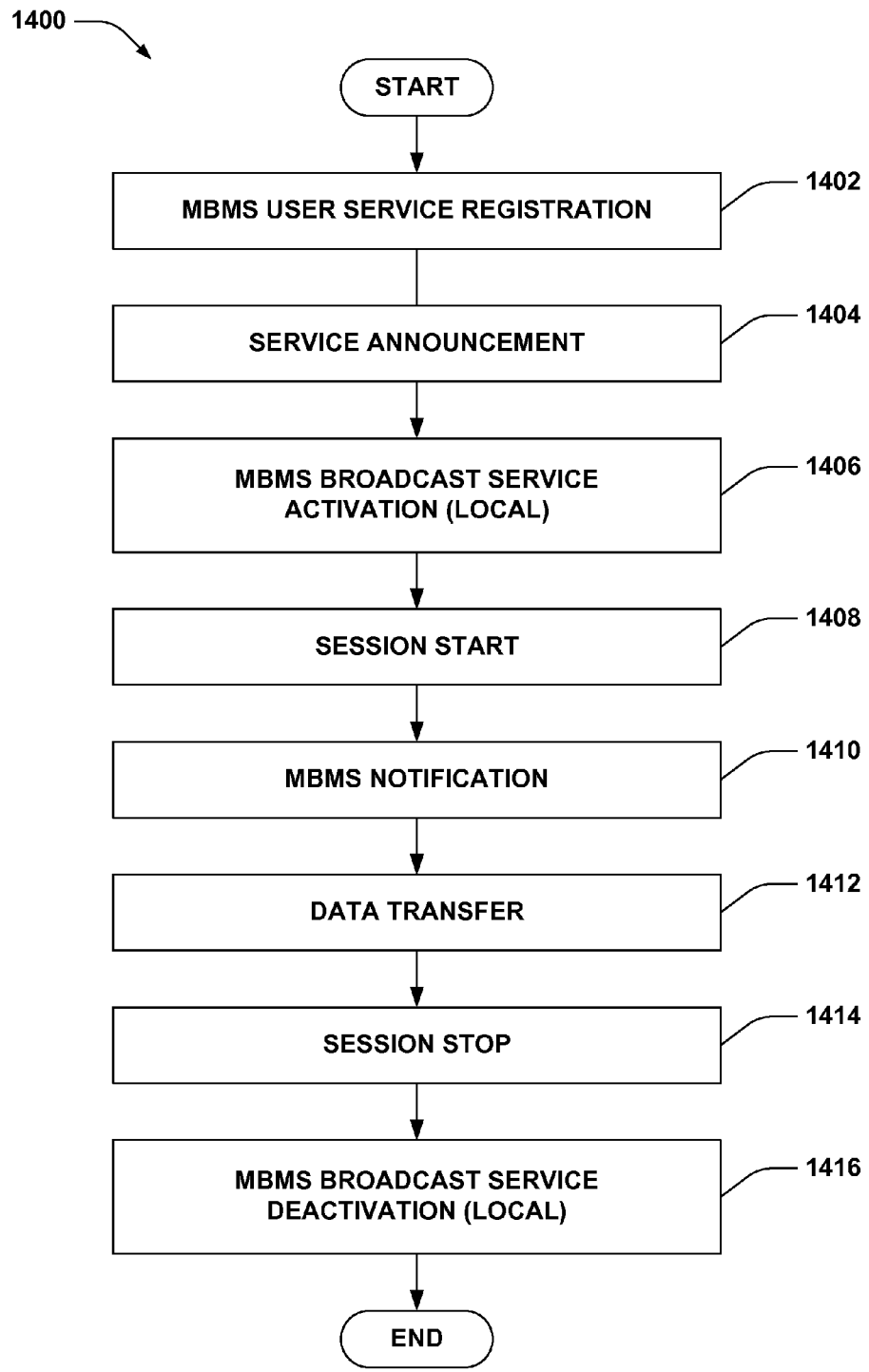
FIG. 14 is a flow chart of an aspect of a methodology for obtaining broadcast data.

FIG. 14 illustrates a method 1400 for use with wireless services such as MBMS. In some aspects, a UE such as the AT 116, 122 may perform the method 1400 to use an MBMS, for example based on information received over the MCCH as described above with respect to the communications 502 illustrated in FIG. 5.

At 1402, an MBMS user service registration is performed by a UE. The UE may accomplish this by transmitting a registration request to the network. The BM-SC may determine whether the UE is allowed to register for the MBMS, and send a grant message to the eNB to transmit to the UE in response.

At 1404, a service announcement is received at the UE, for example over an MBMS bearer or a unicast bearer. At 1406, the UE locally activates the MBMS bearer service. The MBMS broadcast service activation procedure may not register the user in the network, however, and may be a local procedure. For example, an application executing on the UE can activate the MBMS bearer service, which can include activating a receiver to attempt to decode signals received over a corresponding frequency of the MBMS. Thus, there generally is no MBMS bearer service specific signalling exchanged between the UE and the network, and the broadcast service activation procedure does not establish MBMS UE contexts in the UE, MME, and MBMS GW.

At 1408, the MBMS bearer service session starts, and the UE begins to receive MBMS data from the eNB. The UE may receive services in either an idle mode or a connected mode. The connected mode may require signal tracking, synchronization, and feedback. In the connected mode, the UE may transmit information back to the eNB using a unicast connection. In the idle mode, the UE may receive broadcasts of the MBMS without performing all of the functions discussed above with respect to the connected mode. In the idle mode, however, the UE cannot send information back to the eNB.

At block 1410, an MBMS notification is received. Thereafter, at block 1412, data is transferred, which can include the UE receiving data from the eNB. After the data is transferred, in one example, the session can be stopped at block 1414, which can include receiving an indication of the stopped session from the eNB. For example, a BM-SC can command the eNB to stop the session based on one or more events (e.g., a response to a counting request received from the eNB specifying a number of UEs below a threshold). The MBMS bearer service may be subsequently deactivated at 1416. Similar to the activation, the deactivation is typically a local procedure. In this way, MBMS bearer services may be used by the UE.

Figure 15:
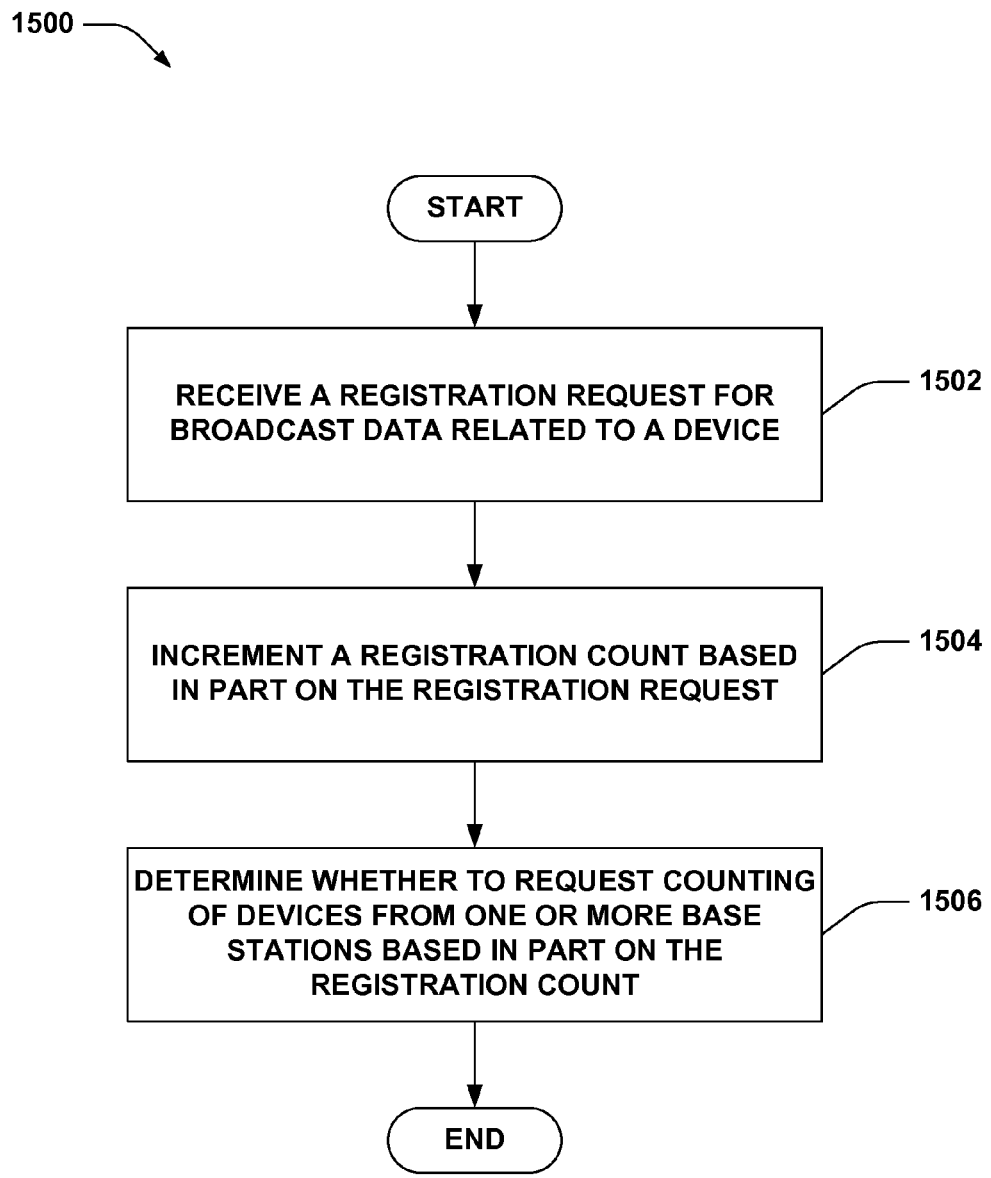
FIG. 15 is a flow chart of an aspect of a methodology for determining whether to enable counting based on a registration count.

FIG. 15 depicts an example methodology 1500 for counting registration requests to determine whether to request device counting in broadcast communications. At 1502, a registration request can be received for broadcast data related to a device. For example, the request can be for an eMBMS, and can include a user service registration request over a unicast channel. In another example, the request can be received from a BM-SC relating to a request for the broadcast data.

At 1504, a registration count can be incremented based in part on the registration request. The registration count can be stored in a memory or other storage medium, and can be incremented for each registration request received. In some examples, an identification of the device can be verified with devices that have previously registered to prevent multiple registration counts for a single device. In another example, the registration count can be decremented for a deregistration request received.

At 1506, it can be determined whether to request counting of devices from one or more base stations based in part on the registration count. For example, if the number of registrations is at least at a threshold, counting can be requested to determine a count of devices receiving or interested in receiving broadcast data. For example, the counting can include request/response counting (e.g., in eMBMS), as described. In another example, the registration count can be used for other purposes as well, such as to determine whether to use unicast or multicast communications for the broadcast data. Where the number of registrations is below the threshold, for example, counting need not be requested, as described herein. In another example, a broadcast mode can be activated/deactivated based on the number of registrations with respect to the threshold.

Figure 16:
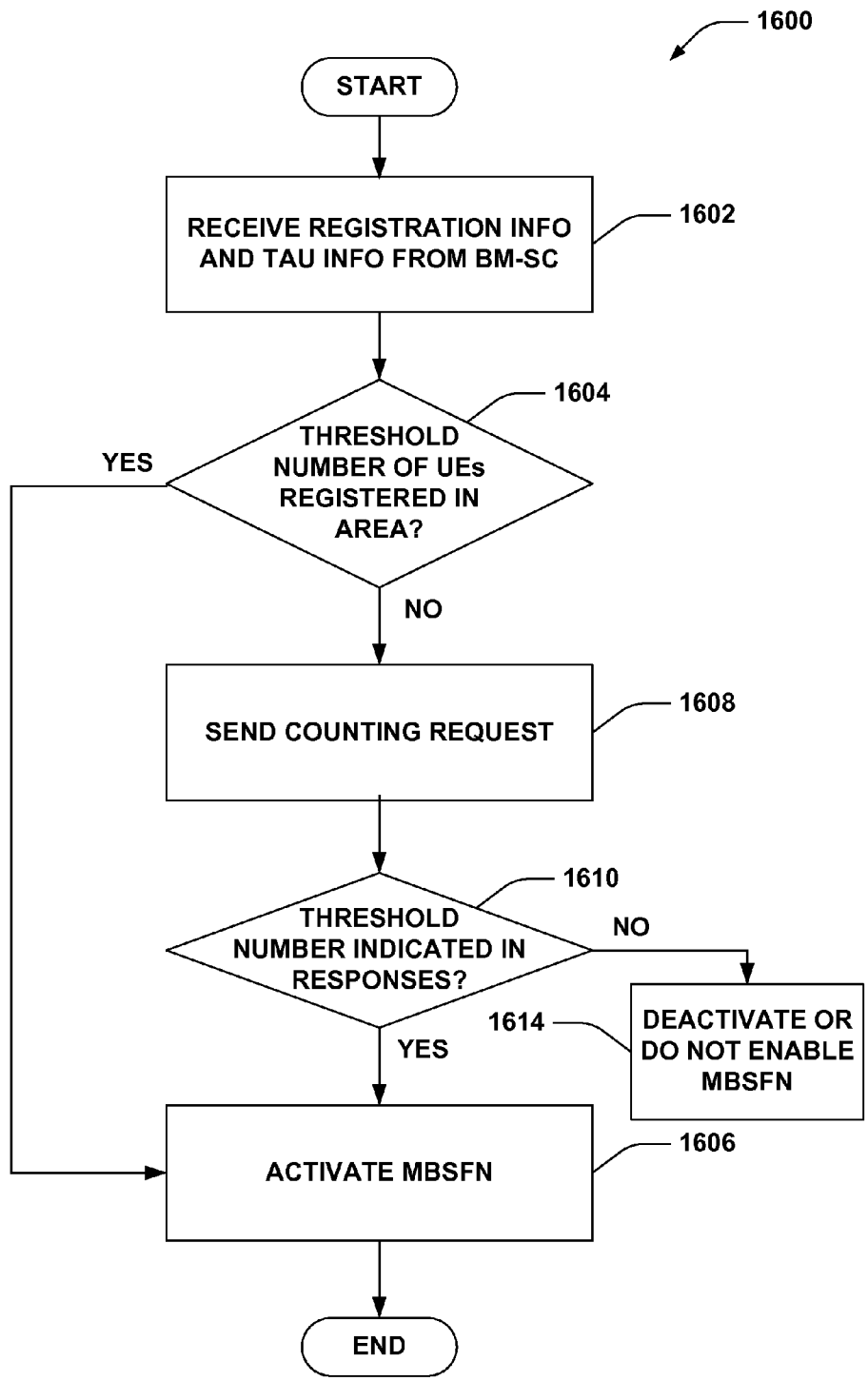
FIG. 16 is a flow chart of an aspect of a methodology for determining whether to activate multicast broadcast services based on a registration count.

FIG. 16 depicts an example methodology 1600 for determining whether to activate MBSFN. At 1602, registration information and/or TAU information can be received from a BM-SC. For example, this can include receiving an indication of registration, parameters related to the registration, and/or the like. At 1604, it can be determined whether a threshold number of UEs are registered in an area. The area, for example, can be related to the TAU.

If the number of UEs registered in the area is at least at the threshold, at 1606, MBSFN can be activated. This can include employing multiple base stations to communicate broadcast data to the UEs. If the number of UEs registered in the area does not achieve the threshold, a counting request can be sent at 1608 to one or more base stations to obtain a more accurate count of devices actually receiving the broadcast data. At 1610, it can be determined whether a threshold number (of devices) are indicated in responses. If so, at 1606, MBSFN can be activated. If not, MBSFN can be deactivated or not enabled at 1614.

Figure 17:
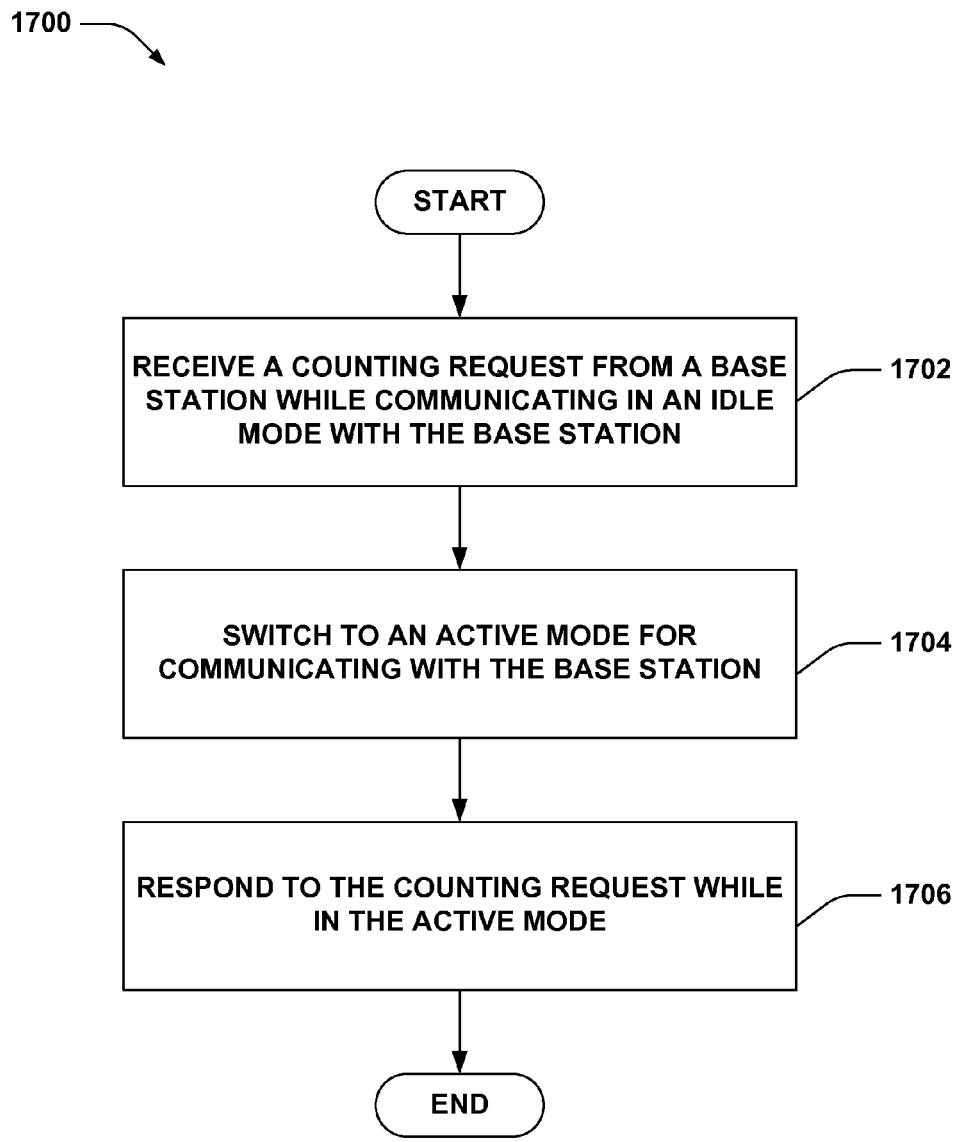
FIG. 17 is a flow chart of an aspect of a methodology for responding to counting requests.

FIG. 17 shows an example methodology 1700 for responding to counting requests received from a base station. At 1702, a counting request can be received from a base station while communicating in an idle mode with the base station. For example, the counting request can be received in a paging message from the base station, as described.

At 1704, communication with the base station can be switched to an active mode. In one example, switching to the active mode can be based on receiving the counting request or for another purpose (e.g., based on a paging signal received from the base station, a request for network access from an application, etc.). In another example, the switch to the active mode can be based on determining expiration of a period of time from receiving the counting request during which the active mode is not utilized for communicating with the base station.

In any case, once in the active mode, the counting request can be responded to at 1706. For example, this can include communicating a counting response to the base station over a unicast channel established for communication in the active mode.

It will be appreciated that, in accordance with one or more aspects described herein, inferences can be made regarding determining whether to request counting and/or activate MBSFN based on a registration count, determining whether to switch to an active communication mode to respond to a counting request, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 18:
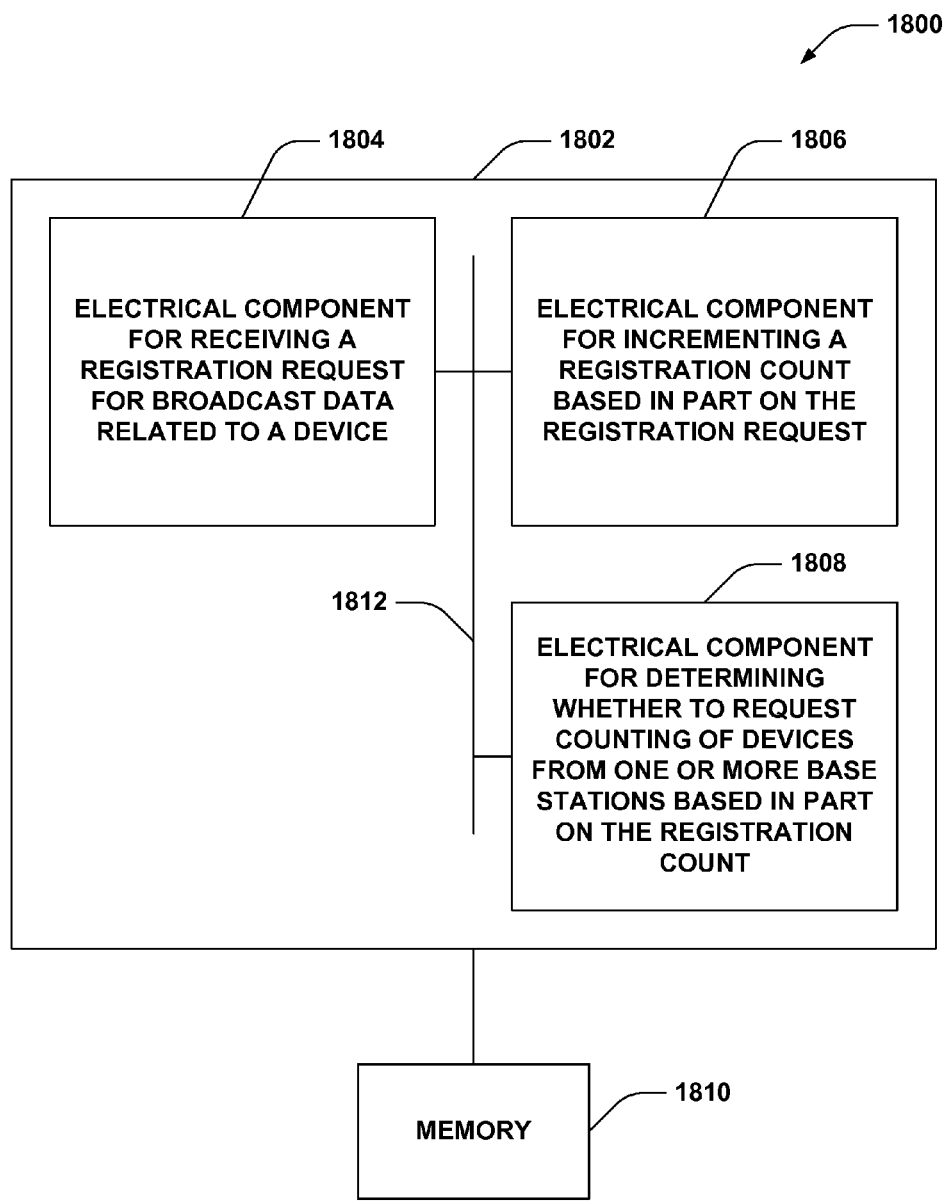
FIG. 18 is a block diagram of an example system that determines whether to enable counting based on a registration count.

FIG. 18 illustrates a system 1800 for determining whether to enable device counting based on a registration count. For example, system 1800 can reside at least partially within a MCE, BM-SC, and/or the like. It is to be appreciated that system 1800 is represented as including functional blocks, which can be functional blocks that represent functions implemented by a processor, software, or combination thereof (e.g., firmware). System 1800 includes a logical grouping 1802 of electrical components that can act in conjunction. For instance, logical grouping 1802 can include an electrical component for receiving a registration request for broadcast data related to a device 1804. This can be the registration request of the device, related information received from a BM-SC, etc. Thus, the registration request can be received from the device in an uplink signal, from the BM-SC over a core network communication, and/or the like. Logical grouping 1802 can also include an electrical component for incrementing a registration count based in part on the registration request 1806. For example, the registration count can be stored in a memory (e.g., memory 1810) and can correspond to a number of devices registered to receive a MBMS. Thus, electrical component 1806 can increment the stored registration count upon receiving registration requests from devices for the MBMS.

In addition, as described, electrical component 1806 can decrement the registration count based on electrical component 1804 receiving a deregistration request. Logical grouping 1802 can also include an electrical component for determining whether to request counting of devices from one or more base stations based in part on the registration count 1808. For example, this can be based on whether the stored registration count is at least at a threshold. If so, counting can be requested from the one or more base stations, which can include communicating an indication to request counting to the one or more base stations over a network connection, as described. For example, electrical component 1804 can include a registration information receiving component 610, and electrical component 1806 can include a device counting component 612, as described above. In addition, for example, electrical component 1808, in an aspect, can include a counting request determining component 614, as described above.

Additionally, system 1800 can include a memory 1810 that retains instructions for executing functions associated with the electrical components 1804, 1806, and 1808. While shown as being external to memory 1810, it is to be understood that one or more of the electrical components 1804, 1806, and 1808 can exist within memory 1810. Electrical components 1804, 1806, and 1808, in an example, can be interconnected over a bus 1812 or similar connection to allow communication among the components. In one example, electrical components 1804, 1806, and 1808 can include at least one processor, or each electrical component 1804, 1806, and 1808 can be a corresponding module of at least one processor. Moreover, in an additional or alternative example, electrical components 1804, 1806, and 1808 can be a computer program product including a computer readable medium, where each electrical component 1804, 1806, and 1808 can be corresponding code.

Figure 19:
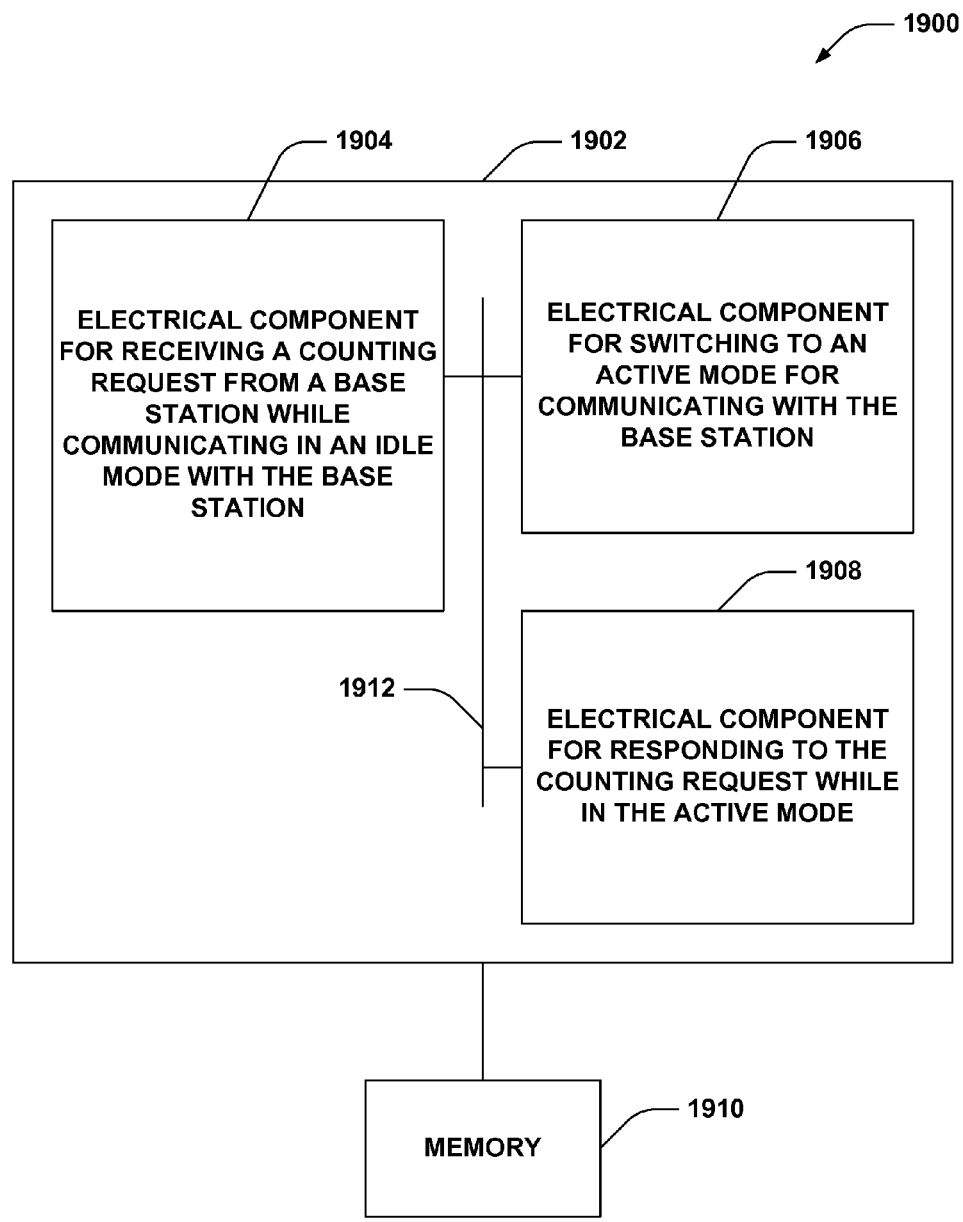
FIG. 19 is a block diagram of an example system that responds to counting requests.

FIG. 19 illustrates a system 1900 for responding to counting requests from a base station. For example, system 1900 can reside at least partially within a device or other receiver. It is to be appreciated that system 1900 is represented as including functional blocks, which can be functional blocks that represent functions implemented by a processor, software, or combination thereof (e.g., firmware). System 1900 includes a logical grouping 1902 of electrical components that can act in conjunction. For instance, logical grouping 1902 can include an electrical component for receiving a counting request from a base station while communicating in an idle mode with the base station 1904. For example, the counting request can be received in a paging message from the base station. Logical grouping 1902 can also include an electrical component for switching to an active mode for communicating with the base station 1906.

In an example, electrical component 1906 can switch to the active mode to communicate the counting request or for another purpose, as described. Switching to active mode can include activating one or more radio interfaces for communication with the one or more base stations. Logical grouping 1902 can also include an electrical component for responding to the counting request while in the active mode 1908. The counting request can be responded to by transmitting a counting response to the one or more base stations over an uplink connection thereto. For example, electrical component 1904 can include a counting request receiving component 1006, and electrical component 1906 can include a communication mode component 1008, as described above. In addition, for example, electrical component 1908, in an aspect, can include a counting request responding component 1010.

Additionally, system 1900 can include a memory 1910 that retains instructions for executing functions associated with the electrical components 1904, 1906, and 1908. While shown as being external to memory 1910, it is to be understood that one or more of the electrical components 1904, 1906, and 1908 can exist within memory 1910. Electrical components 1904, 1906, and 1908, in an example, can be interconnected over a bus 1912 or similar connection to allow communication among the components. In one example, electrical components 1904, 1906, and 1908 can include at least one processor, or each electrical component 1904, 1906, and 1908 can be a corresponding module of at least one processor. Moreover, in an additional or alternative example, electrical components 1904, 1906, and 1908 can be a computer program product including a computer readable medium, where each electrical component 1904, 1906, and 1908 can be corresponding code.

Figure 20:
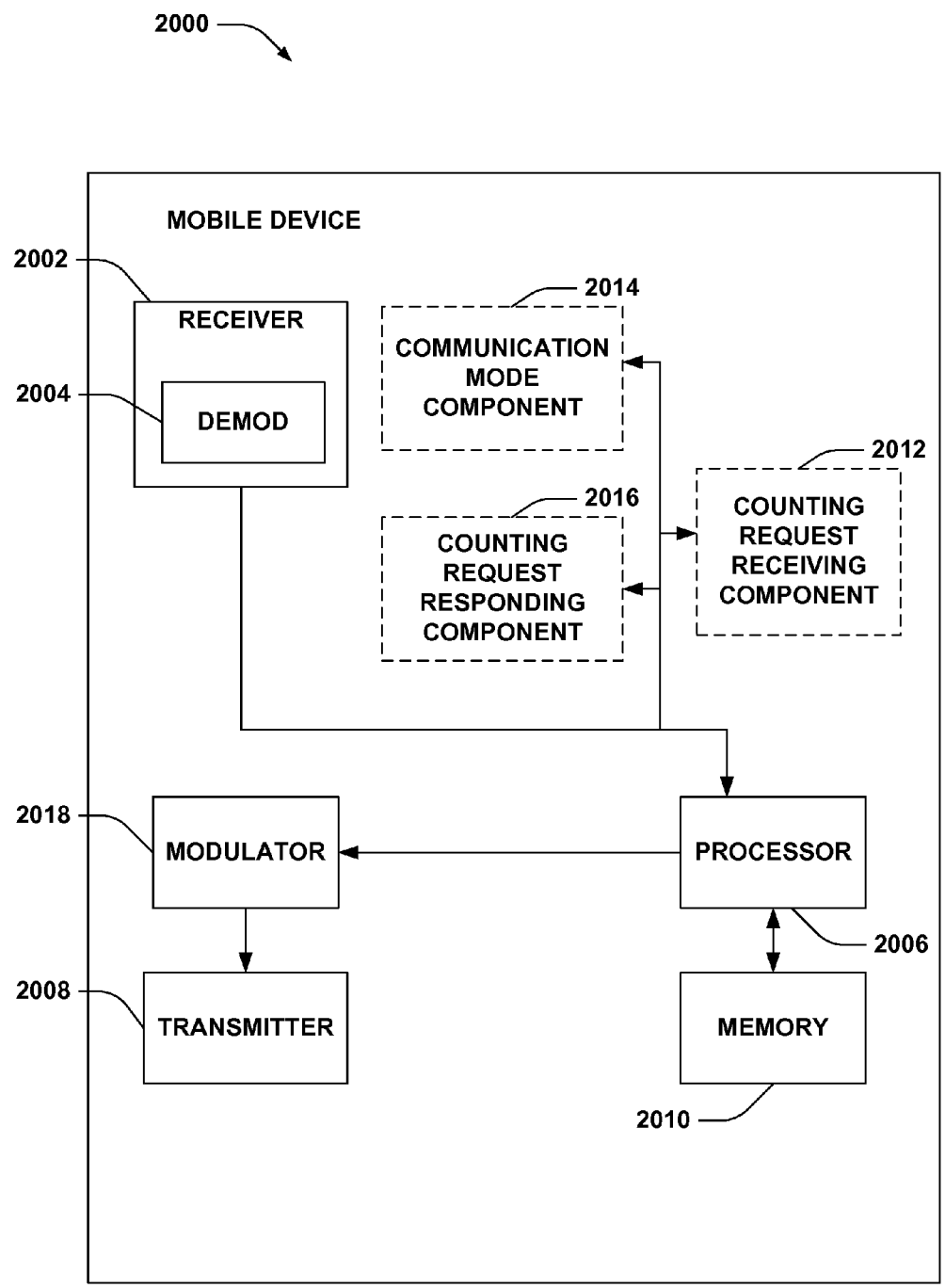
FIG. 20 is a block diagram of an aspect of an example mobile device in accordance with aspects described herein.

FIG. 20 is an illustration of a mobile device 2000 that facilitates responding to counting requests. Mobile device 2000 may include a receiver 2002 that receives a signal from, for instance, a receive antenna (not shown), performs typical actions on (e.g., filters, amplifies, downconverts, etc.) the received signal, and digitizes the conditioned signal to obtain samples. Receiver 2002 can include a demodulator 2004 that can demodulate received symbols and provide them to a processor 2006 for channel estimation. Processor 2006 can be a processor dedicated to analyzing information received by receiver 2002 and/or generating information for transmission by a transmitter 2008, a processor that controls one or more components of mobile device 2000, and/or a processor that both analyzes information received by receiver 2002, generates information for transmission by transmitter 2008, and controls one or more components of mobile device 2000.

Mobile device 2000 can additionally include memory 2010 that is operatively coupled to processor 2006 and that can store data to be transmitted, received data, information related to available channels, data associated with analyzed signal and/or interference strength, information related to an assigned channel, power, rate, or the like, and any other suitable information for estimating a channel and communicating via the channel. Memory 2010 can additionally store protocols and/or algorithms associated with estimating and/or utilizing a channel (e.g., performance based, capacity based, etc.).

It will be appreciated that the data store (e.g., memory 2010) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 2010 of the subject systems and methods is intended to include, without being limited to, these and any other suitable types of memory.

Processor 2006 can further be optionally operatively coupled to a counting request receiving component 2012, which can be similar to counting request receiving component 1006, a communication mode component 2014, which can be similar to communication mode component 1008, and/or a counting request responding component 2016, which can be similar to counting request responding component 1010.

Mobile device 2000 still further includes a modulator 2018 that modulates signals for transmission by transmitter 2008 to, for instance, a base station, another mobile device, etc. Moreover, for example, mobile device 2000 can include multiple transmitters 2008 for multiple network interfaces, as described. Although depicted as being separate from the processor 2006, it is to be appreciated that the counting request receiving component 2012, communication mode component 2014, counting request responding component 2016, demodulator 2004, and/or modulator 2018 can be part of the processor 2006 or multiple processors (not shown)), and/or stored as instructions in memory 2010 for execution by processor 2006.

Figure 21:
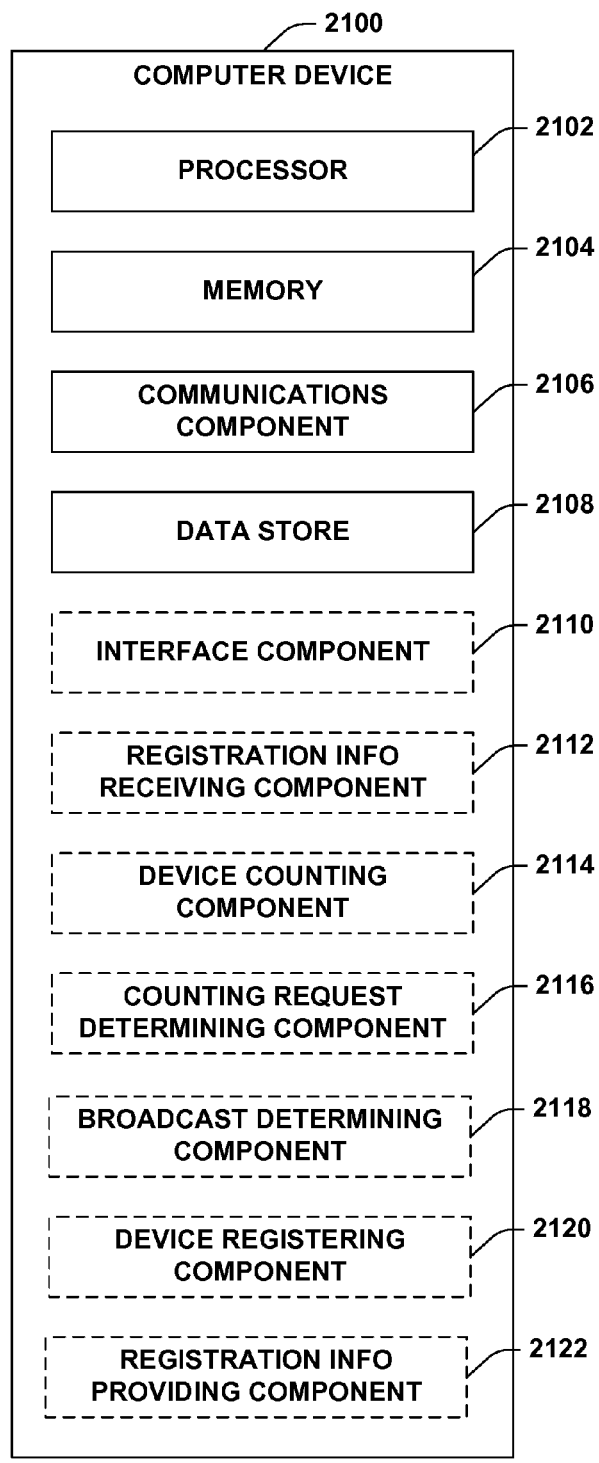
FIG. 21 is a block diagram of an aspect of a computer device in accordance with aspects described herein.

FIG. 21 illustrates a computer device 2100 that can include an MCE 304, 606, 706, 806, 906, 1108, 1206, 1306, etc., BW-SC 312, 612, 712, 812, 912, 1114, 1212, 1312, etc. Computer device 2100 includes a processor 2102 for carrying out processing functions associated with one or more of components and functions described herein. Processor 2102 can include a single or multiple set of processors or multi-core processors. Moreover, processor 2102 can be implemented as an integrated processing system and/or a distributed processing system.

Computer device 2100 further includes a memory 2104, such as for storing local versions of applications being executed by processor 2102. Memory 2104 can include substantially any type of memory usable by a computer, such as random access memory (RAM), read only memory (ROM), tapes, magnetic discs, optical discs, volatile memory, non-volatile memory, and any combination thereof. Computer device 2100 also includes one or more components 2106-2122, which can be stored in memory 2104, executed by processor 2102 (e.g., based on instructions stored in memory 2104), be implemented within one or more processors 2102, and/or the like.

Further, computer device 2100 includes a communications component 2106 that provides for establishing and maintaining communications with one or more parties utilizing hardware, software, and services as described herein. Communications component 2106 may carry communications between components on computer device 2100, as well as between computer device 2100 and external devices, such as devices located across a communications network and/or devices serially or locally connected to computer device 2100. For example, communications component 2106 may include one or more buses, and may further include transmit chain components and receive chain components associated with a transmitter and receiver, respectively, operable for interfacing with external devices.

Additionally, computer device 2100 may further include a data store 2108, which can be any suitable combination of hardware and/or software, that provides for mass storage of information, databases, and programs employed in connection with aspects described herein. For example, data store 2108 may be a data repository for applications not currently being executed by processor 2102.

Computer device 2100 may optionally include an interface component 2110 operable to receive inputs from a user of computer device 2100, and further operable to generate outputs for presentation to the user. Interface component 2110 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, interface component 2110 may include one or more output devices, including but not limited to a display, a speaker, a haptic feedback mechanism, a printer, any other mechanism capable of presenting an output to a user, or any combination thereof. In another example, interface component 2110 can be an application programming interface (API) that can be accessed by one or more devices to perform functions on computer device 2100.

In addition, in the depicted example, computer device 2100 can optionally include one or more of a registration information receiving component 2112, which can be similar to registration information receiving component 610, a device counting component 2114, which can be similar to device counting component 612, a counting request determining component 2116, which can be similar to counting request determining component 614, a broadcast determining component 2118, which can be similar to broadcast determining component 616, a device registering component 2120, which can be similar to device registering component 618, and/or a registration information providing component 2122, which can be similar to registration information providing component 620. Thus, these components 2112, 2114, 2116, 2118, 2120, and/or 2122 can utilize processor 2102 to execute instructions associated therewith, memory 2104 to store information associated therewith, communications component 2106 to carry out communications, and/or the like, as described. In addition, it is to be appreciated that computer device 2100 can include additional or alternative components described herein.

Figure 22:
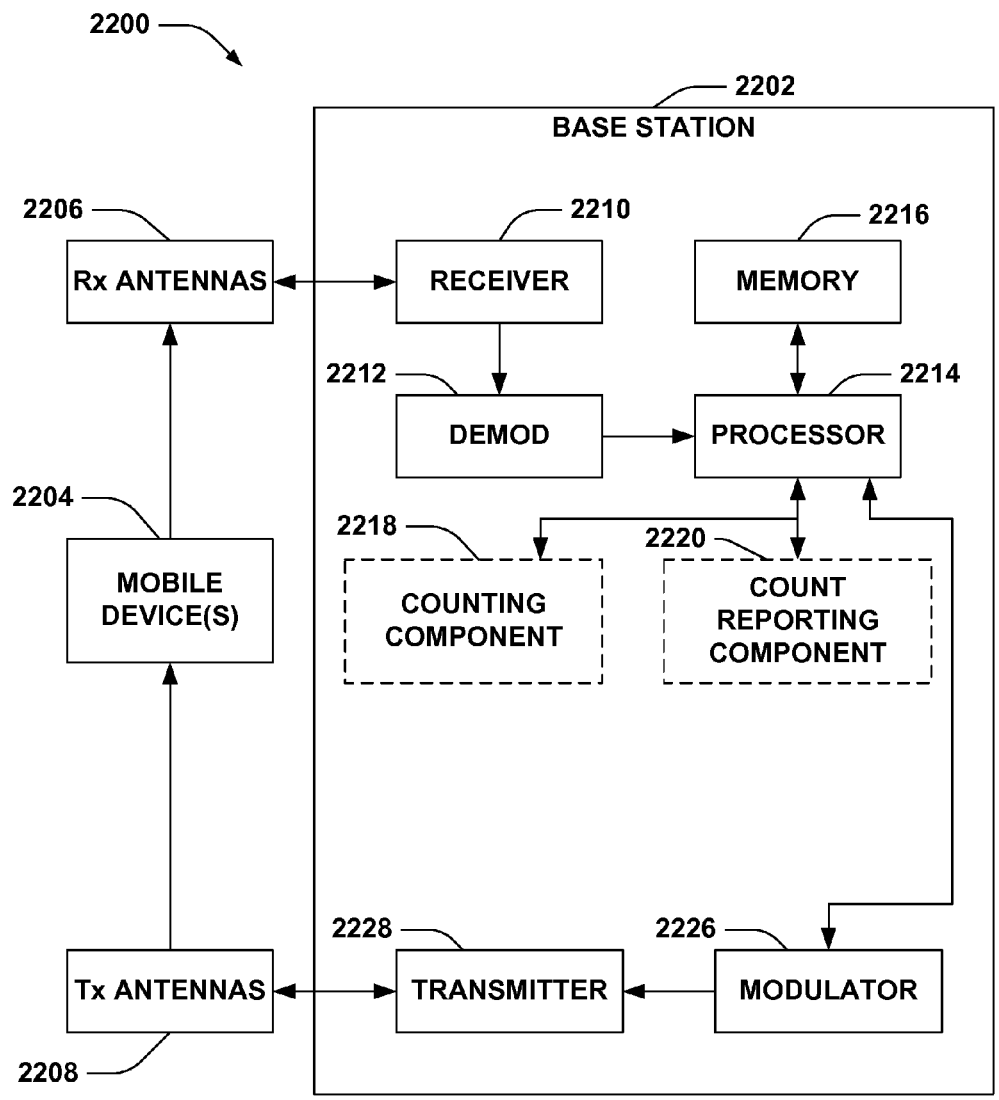
FIG. 22 is a block diagram of an example system in accordance with aspects described herein.

FIG. 22 is an illustration of a system 2200 that facilitates communicating with one or more devices using wireless communications. System 2200 comprises a base station 2202, which can be substantially any base station (e.g., a small base station, such as a femtocell, picocell, etc., mobile base station . . . ), a relay, etc., having a receiver 2210 that receives signal(s) from one or more mobile devices 2204 through a plurality of receive antennas 2206 (e.g., which can be of multiple network technologies, as described), and a transmitter 2228 that transmits to the one or more mobile devices 2204 through a plurality of transmit antennas 2208 (e.g., which can be of multiple network technologies, as described). In addition, in one example, transmitter 2228 can transmit to the mobile devices 2204 over a wired front link. Receiver 2210 can receive information from one or more receive antennas 2206 and is operatively associated with a demodulator 2212 that demodulates received information. In addition, in an example, receiver 2210 can receive from a wired backhaul link. Moreover, though shown as separate antennas, it is to be appreciated that at least one transmit antenna 2208 can be combined with at least one receive antenna 2206 as a single antenna. Demodulated symbols are analyzed by a processor 2214 that can be similar to the processor described above with regard to FIG. 20, and which is coupled to a memory 2216 that stores information related to estimating a signal (e.g., pilot) strength and/or interference strength, data to be transmitted to or received from mobile device(s) 2204 (or a disparate base station (not shown)), and/or any other suitable information related to performing the various actions and functions set forth herein.

Processor 2214 is further optionally coupled to counting component 2218, which can be similar to counting component 1012, and/or a count reporting component 2220, which can be similar to count reporting component 1014. Moreover, for example, processor 2214 can modulate signals to be transmitted using modulator 2226, and transmit modulated signals using transmitter 2228. Transmitter 2228 can transmit signals to mobile devices 2204 over Tx antennas 2208. Furthermore, although depicted as being separate from the processor 2214, it is to be appreciated that the counting component 2218, count reporting component 2220, demodulator 2212, and/or modulator 2226 can be part of the processor 2214 or multiple processors (not shown), and/or stored as instructions in memory 2216 for execution by processor 2214.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may include one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes both computer storage media and communication media including any medium that facilitates transfer of a computer program from one place to another. A storage medium may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, substantially any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for counting devices related to a broadcast data service, comprising:
   receiving, at a core network component, a registration request for the broadcast data service related to a device, wherein the registration request includes a location of the device;
   incrementing, at the core network component, a registration count based in part on the registration request being accepted which is based in part on the location of the device received in the registration request and a number of devices accessing the broadcast data service in a coverage area that the device is located in;
   determining, at the core network component, whether to request counting of devices receiving the broadcast data service based in part on the registration count and locations of the devices; and
   transmitting, by the core network component, at least one counting request to one or more base stations in response to determining to request counting of the devices receiving the broadcast data service, wherein the core network component is a Broadcast/Multicast Service Center (BM-SC).

2. The method of claim 1, further comprising determining whether to utilize multicast or unicast communications for the broadcast data service based in part on the registration count.

3. The method of claim 1, further comprising:
   receiving a deregistration request from the device; and
   decrementing the registration count based in part on the receiving the deregistration request.

4. The method of claim 1, further comprising indicating to a multicast coordinating entity to request counting based in part on determining to request counting of the devices.

5. An apparatus for counting devices related to a broadcast data service, comprising:
   means for receiving, at a core network component, a registration request for the broadcast data service related to a device, wherein the registration request includes a location of the device;
   means for incrementing, at the core network component, a registration count based in part on the registration request being accepted which is based in part on the location of the device received in the registration request and a number of devices accessing the broadcast data service in a coverage area that the device is located in;
   means for determining, at the core network component, whether to request counting of devices receiving the broadcast data service based in part on the registration count and locations of the devices; and
   means for transmitting, by the core network component, at least one counting request to one or more base stations in response to determining to request counting of the devices receiving the broadcast data service, wherein the core network component is a Broadcast/Multicast Service Center (BM-SC).

6. The apparatus of claim 5, further comprising means for determining whether to utilize multicast or unicast communications for the broadcast data service based in part on the registration count.

7. The apparatus of claim 5, wherein the means for receiving receives a deregistration request from the device, and the means for incrementing decrements the registration count based in part on the deregistration request.

8. The apparatus of claim 5, and wherein the means for determining indicates to a multicast coordinating entity to request counting based in part on determining to request counting of the devices.

9. An apparatus for wireless communication, comprising:
   at least one processor configured to:
      receive, at a core network component, a registration request for a broadcast data service related to a device, wherein the registration request includes a location of the device;
      increment, at the core network component, a registration count based in part on the registration request being accepted which is based in part on the location of the device received in the registration request and a number of devices accessing the broadcast data service in a coverage area that the device is located in;
      determine, at the core network component, whether to request counting of devices receiving the broadcast data service based in part on the registration count and locations of the devices; and
      transmit, by the core network component, at least one counting request to one or more base stations in response to determining to request counting of the devices receiving the broadcast data service, wherein the core network component is a Broadcast/Multicast Service Center (BM-SC); and
   a memory coupled to the at least one processor.

10. The apparatus of claim 9, wherein the at least one processor is further configured to determine whether to utilize multicast or unicast communications for the broadcast data service based in part on the registration count.

11. The apparatus of claim 9, wherein the at least one processor is further configured to:
   receive a deregistration request from the device; and
   decrement the registration count based in part on the receiving the deregistration request.

12. The apparatus of claim 9, and wherein the at least one processor is further configured to indicate to a multicast coordinating entity to request counting based in part on determining to request counting of the devices.

13. A non-transitory computer-readable medium storing computer executable code for counting devices related to a broadcast data service, comprising:
   code for causing at least one computer to receive, at a core network component, a registration request for the broadcast data service related to a device, wherein the registration request includes a location of the device;
   code for causing the at least one computer to increment, at the core network component, a registration count based in part on the registration request being accepted which is based in part on the location of the device received in the registration request and a number of devices accessing the broadcast data service in a coverage area that the device is located in;
   code for causing the at least one computer to determine, at the core network component, whether to request counting of devices receiving the broadcast data service based in part on the registration count and locations of the devices; and
   code for causing the at least one computer to transmit at least one counting request to one or more base stations in response to determining to request counting of the devices receiving the broadcast data service, wherein the core network component is a Broadcast/Multicast Service Center (BM-SC).

14. An apparatus for counting devices related to a broadcast data service, comprising:
   a registration information receiving component for receiving, at a core network component, a registration request for the broadcast data service related to a device, wherein the registration request includes a location of the device;
   a device counting component for incrementing, at the core network component, a registration count based in part on the registration request being accepted which is based in part on the location of the device received in the registration request and a number of devices accessing the broadcast data service in a coverage area that the device is located in; and
   a counting request determining component for determining, at the core network component, whether to request counting of devices receiving the broadcast service based in part on the registration count and locations of the devices and for transmitting at least one counting request to one or more base stations in response to determining to request counting of the devices receiving the broadcast data service, wherein the core network component is a Broadcast/Multicast Service Center (BM-SC).

15. The apparatus of claim 14, further comprising a broadcast determining component for determining whether to utilize multicast or unicast communications for the broadcast data service based in part on the registration count.

16. The apparatus of claim 14, wherein the registration information receiving component receives a deregistration request from the device, and the device counting component decrements the registration count based in part on the deregistration request.

17. The apparatus of claim 14, and wherein the counting request determining component indicates to a multicast coordinating entity to request counting based in part on determining to request counting of the devices.

18. A method for counting devices related to broadcast data, comprising:
- receiving, at a core network component, a registration request for broadcast data, wherein the registration request includes a location of a device;
- incrementing, at the core network component, a registration count based in part on the registration request being accepted which is based in part on the location of the device received in the registration request and a number of devices accessing the broadcast data service in a coverage area that the device is located in;
- determining, at the core network component, to request counting of devices from one or more base stations based in part on the registration count satisfying a threshold and the locations of the devices; and
- transmitting, by the core network component, at least one counting request to the one or more base stations in response to determining to request counting of the devices, wherein the core network component is a Broadcast/Multicast Service Center (BM-SC).

* * * * *